US008866889B2

(12) United States Patent
Masalkar et al.

(10) Patent No.: US 8,866,889 B2
(45) Date of Patent: Oct. 21, 2014

(54) IN-HOME DEPTH CAMERA CALIBRATION

(75) Inventors: Prafulla J. Masalkar, Issaquah, WA (US); Szymon P. Stachniak, Kirkland, WA (US); Tommer Leyvand, Seattle, WA (US); Zhengyou Zhang, Bellevue, WA (US); Leonardo Del Castillo, Carnation, WA (US); Zsolt Mathe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 603 days.

(21) Appl. No.: 12/939,038

(22) Filed: Nov. 3, 2010

(65) Prior Publication Data

US 2012/0105585 A1    May 3, 2012

(51) Int. Cl.
  *H04N 13/02*    (2006.01)
  *H04N 13/00*    (2006.01)
  *G06F 3/01*    (2006.01)
  *H04N 13/04*    (2006.01)
  *G06T 7/00*    (2006.01)

(52) U.S. Cl.
  CPC .. *H04N 13/0425* (2013.01); *G06T 2207/30196* (2013.01); *H04N 13/0022* (2013.01); *G06F 3/017* (2013.01); *H04N 13/0271* (2013.01); *G06T 2207/10021* (2013.01); *G06T 7/002* (2013.01); *G06T 7/0075* (2013.01)
  USPC ............................................................. 348/46

(58) Field of Classification Search
  CPC ....... H04N 13/0246; G06T 15/50; G06K 9/00
  USPC ............................................ 348/46; 382/154
  See application file for complete search history.

(56) References Cited

U.S. PATENT DOCUMENTS

| 4,627,620 | A | 12/1986 | Yang |
| 4,630,910 | A | 12/1986 | Ross et al. |
| 4,645,458 | A | 2/1987 | Williams |
| 4,695,953 | A | 9/1987 | Blair et al. |

(Continued)

FOREIGN PATENT DOCUMENTS

| CN | 101086681 | 12/2007 |
| CN | 101271591 | 9/2008 |

(Continued)

OTHER PUBLICATIONS

International Search Report and Written Opinion dated May 31, 2012 in International Patent Application No. PCT/US2011/058951.

(Continued)

*Primary Examiner* — Jay Patel
*Assistant Examiner* — Yulin Sun
(74) *Attorney, Agent, or Firm* — Micah Goldsmith; Sergey Lamansky; Micky Minhas

(57) ABSTRACT

A system and method are disclosed for calibrating a depth camera in a natural user interface. The system in general obtains an objective measurement of true distance between a capture device and one or more objects in a scene. The system then compares the true depth measurement to the depth measurement provided by the depth camera at one or more points and determines an error function describing an error in the depth camera measurement. The depth camera may then be recalibrated to correct for the error. The objective measurement of distance to one or more objects in a scene may be accomplished by a variety of systems and methods.

9 Claims, 17 Drawing Sheets

(56) References Cited

U.S. PATENT DOCUMENTS

| | | | |
|---|---|---|---|
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,512,732 B1 * | 1/2003 | Bierhoff et al. | 369/109.02 |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,633,664 B1 | 10/2003 | Minamida | |
| 6,640,202 B1 | 10/2003 | Dietz et al. | |
| 6,661,918 B1 | 12/2003 | Gordon et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 * | 9/2004 | Grzeszczuk et al. | 382/154 |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,003,136 B1 | 2/2006 | Harville | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |

(56) References Cited

U.S. PATENT DOCUMENTS

| | | | |
|---|---|---|---|
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2004/0119005 A1* | 6/2004 | Krohn et al. | 250/239 |
| 2008/0026838 A1 | 1/2008 | Dunstan et al. | |
| 2008/0123937 A1* | 5/2008 | Arias Estrada et al. | 382/154 |
| 2009/0209343 A1* | 8/2009 | Foxlin et al. | 463/36 |
| 2009/0231425 A1 | 9/2009 | Zalewski | |
| 2010/0142815 A1 | 6/2010 | Sim | |
| 2010/0150404 A1* | 6/2010 | Marks et al. | 382/107 |
| 2011/0025827 A1* | 2/2011 | Shpunt et al. | 348/47 |
| 2012/0026322 A1* | 2/2012 | Malka et al. | 348/142 |

FOREIGN PATENT DOCUMENTS

| | | |
|---|---|---|
| CN | 101254344 B | 6/2010 |
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2010018009 A1 | 2/2010 |

OTHER PUBLICATIONS

Young Min Kim et al., "Design and Calibration of a Multi-view TOF Sensor Fusion System," Computer Vision and Pattern Recognition Workshops, 2008, Jun. 23-28, 2008; retrieved from Internet: <http://www.stanford.edu/~ddc/cvpr2008mvtof.pdf>.

A D Worral et al., "A simple, intuitive camera calibration tool for natural images.", Proceedings of the conference on British machine vision (vol. 2), 1984; retrieved from Internet: <http://citeseerx.ist.psu.edu/viewdoc/download?doi=10.1.1.57.3568&rep=rep1&type=pdf>.

Akash M Kushal et al., "A simple method for interactive 3D reconstruction and camera calibration from a single view," In Proceedings Indian Conference in Computer Vision, Graphics and Image Processing, 2002; retrieved from Internet: <http://www.cse.iitd.ernet.in/vglab/demo/single-view/2plane/2plane.pdf>.

Erkan Besdok, "3D Vision by Using Calibration Pattern with Inertial Sensor and RBF Neural Networks," Sensors 2009; retrieved from Internet: <http://www.mdpi.com/1424-8220 19/6/4572/pdf>.

Fengjun LV et al., "Self-Calibration of a camera from video of a walking human," 16th International Conference on Pattern Recognition, 2002, ; retrieved from Internet: <http://citeseerx.ist.psu.edu/viewdoc/download;jsessionid=92CA5620A0095017A05A06077A44393A?doi=10.1.1.15.2236&rep=rep1&type=pdf>.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Toyama, Kentaro, et al., "Probabilistic Tracking in a Metric Space," Eighth International Conference on Computer Vision, Vancouver, Canada, vol. 2, Jul. 2001, 8 pages.

Office Action dated Dec. 16, 2013 in Chinese Patent Application No. 201110364401.1.

(56) References Cited

OTHER PUBLICATIONS

Partial English translation of Office Action dated Dec. 16, 2013 in Chinese Patent Application No. 201110364401.1.
English Abstract for CN101271591 published Sep. 24, 2008.
English Abstract for CN101086681 published Dec. 12, 2007.
Response to Office Action filed Apr. 29, 2014 in Chinese Patent Application No. 201110364401.1.
Partial English translation of Response to Office Action filed Apr. 29, 2014 in Chinese Patent Application No. 201110364401.1.

* cited by examiner

Center-tile Depth Error Over Range for Various Values of E

Depth Error Across FOV for E=0.12°

IN-HOME DEPTH CAMERA CALIBRATION

BACKGROUND

In the past, computing applications such as computer games and multimedia applications used controllers, remotes, keyboards, mice, or the like to allow users to manipulate game characters or other aspects of an application. More recently, computer games and multimedia applications have begun employing cameras and software gesture recognition engines to provide a natural user interface ("NUI"). With NUI, user gestures and speech are detected, interpreted and used to control game characters or other aspects of an application.

NUI systems use three-dimensional (3-D) depth cameras to capture 3-D data of a scene. Depth cameras require several components to be precisely aligned in order to properly measure depth. Even a slight misalignment can result in significant depth measurement error. Misalignment may occur due to a variety of conditions, including for example improper manufacturing, extreme temperatures or other environmental factors, dropping the camera or other physical damage, etc. Once the alignment is changed, the depth may be improperly reported in a number of ways. The results of this distortion can cause a shift in the camera's depth range, a transformation of an object's dimensions, or a variety of other distortions may occur. It is therefore desirable to provide a system for calibrating a depth camera to capture an accurate depth image, preferably with minimal impact on the user experience.

SUMMARY

The present technology, roughly described, relates to recalibrating a depth sensor used in a NUI system. The NUI system in general includes a capture device including a depth sensor and an RGB sensor. The depth projector may emit light onto a scene, which light is reflected back and sensed by the depth sensor and RGB sensor. The depth sensor uses the reflected light to determine the depth of objects within the scene. The present technology relates to a system for recalibrating a depth sensor to correct for any depth measurement error which may occur after factory calibration of the depth sensor.

In general, the present system obtains a true depth measurement to an object in a field of view. The system then compares the true depth measurement to a depth measurement provided by the depth sensor to define an error model of the deviation. The present system provides a variety of methods for determining true depth measurements of one or more objects in a scene independently of the depth measurement obtained from the depth sensor. In straightforward embodiments, the depth sensor may simply be adjusted to the true depth. In further embodiments, more complex mathematical schemas may be developed to model depth error. The depth error may then be compensated for by minimizing the depth error.

One example of the present technology relates to a method of recalibrating a depth sensor of a natural user interface, the depth sensor capturing image data from a 3-D space. The method comprising the steps: (a) measuring a depth value of at least one sample point in the 3-D space using the depth sensor; (b) determining a true depth value of the at least one sample point independently of the measurement of said step (a); (c) modeling a depth error resulting from a deviation in the true depth determined in said step (b) and the depth measured in said step (a); and (d) correcting the depth measurements made by the depth sensor using the depth error modeled in said step (c).

A further example of the present technology relates to a computer-readable storage medium including instructions for programming a processor to perform a method of recalibrating a depth sensor of a natural user interface, the depth sensor capturing image data from a 3-D space. The method comprising the steps: (a) measuring the depth of two or more points on a calibration object within the 3-D space using the depth sensor; (b) determining the true depth of the two or more points on the calibration object independently of the depth sensor; (c) modeling a depth error resulting from a deviation in the true depth determined in said step (b) and the depth measured in said step (a); and (d) compensating depth measurements made by the depth sensor using the depth error modeled in said step (c).

In another example, the present technology relates to a system for recalibrating a depth sensor of a natural user interface, the depth sensor capturing image data from a 3-D space, the system comprising: a calibration object positioned within the 3-D space; and a computing device associated with the depth sensor, the computing device including a recalibration engine for comparing a true depth values of points on the calibration object in the 3-D space against depth values measured by the depth sensor, and deriving an error model which describes a deviation between the true depth values and the depth values measured by the depth sensor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Embodiments of the present technology will now be described with reference to FIGS. 1-24B which in general relate to a system for calibrating a depth camera. The system in general obtains an objective measurement of distance between a depth camera and one or more objects in a scene, referred to herein as true depth. The system then compares the true depth measurement to the depth measurement provided by the depth camera at one or more points and determines an error function describing an error in the depth camera measurement. The depth camera may then be recalibrated to correct for the error. The objective measurement of distance to one or more objects in a scene may be accomplished by a variety of systems and methods. These systems and methods are described below.

Figure 1:
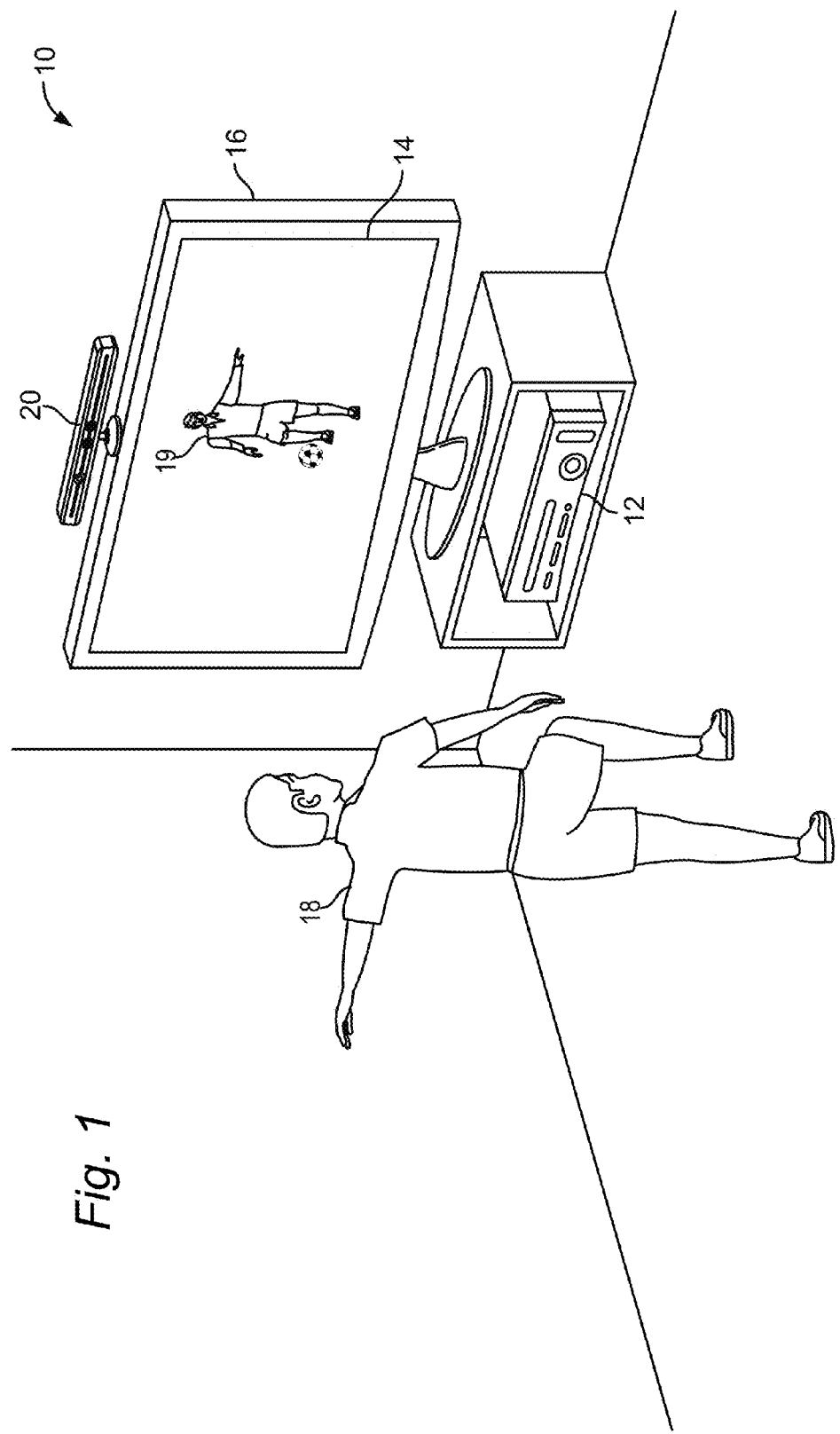
FIG. 1 illustrates an example embodiment of a target recognition, analysis, and tracking system.
Figure 2:
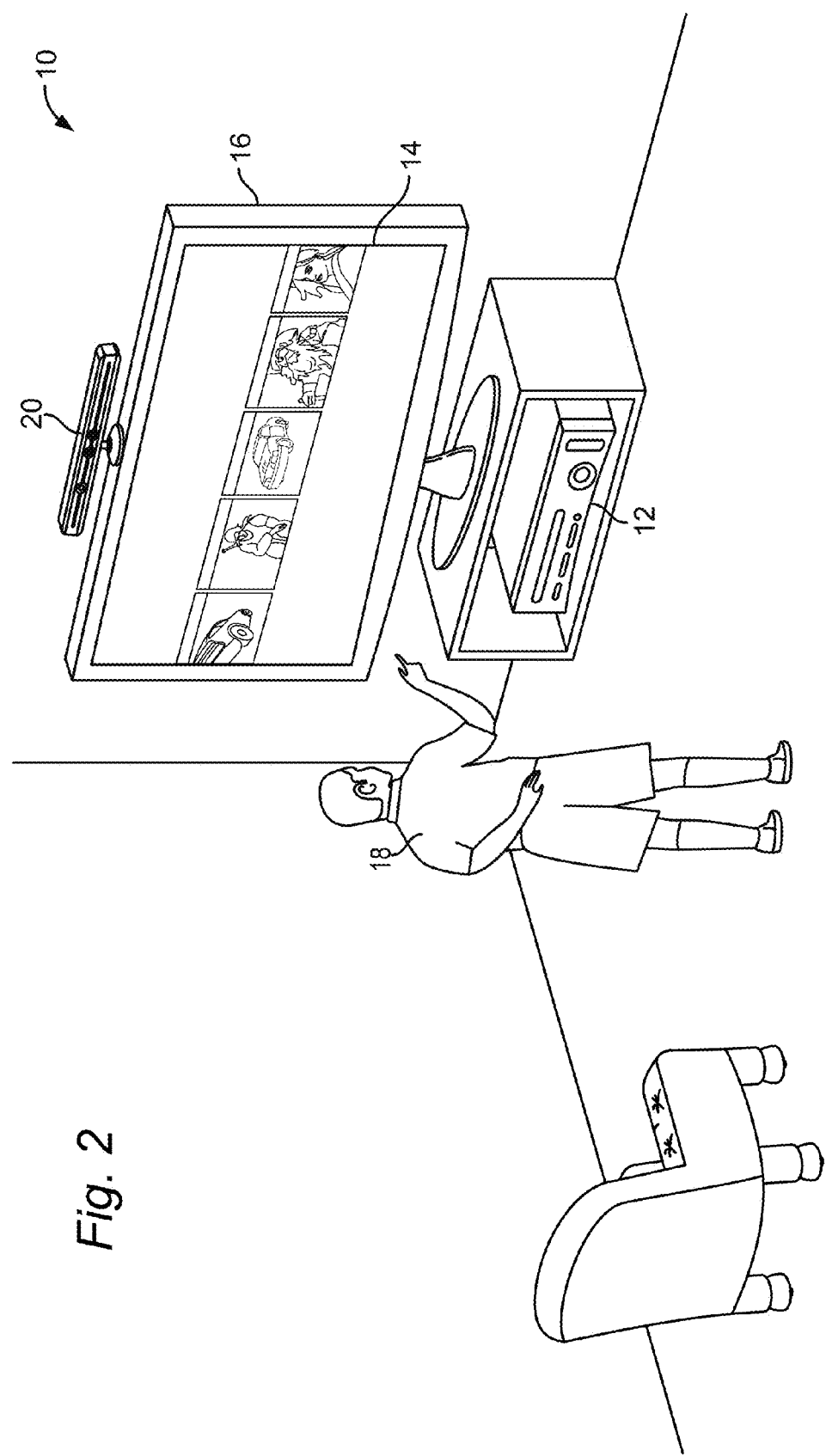
FIG. 2 illustrates a further example embodiment of a target recognition, analysis, and tracking system.
Figure 3:
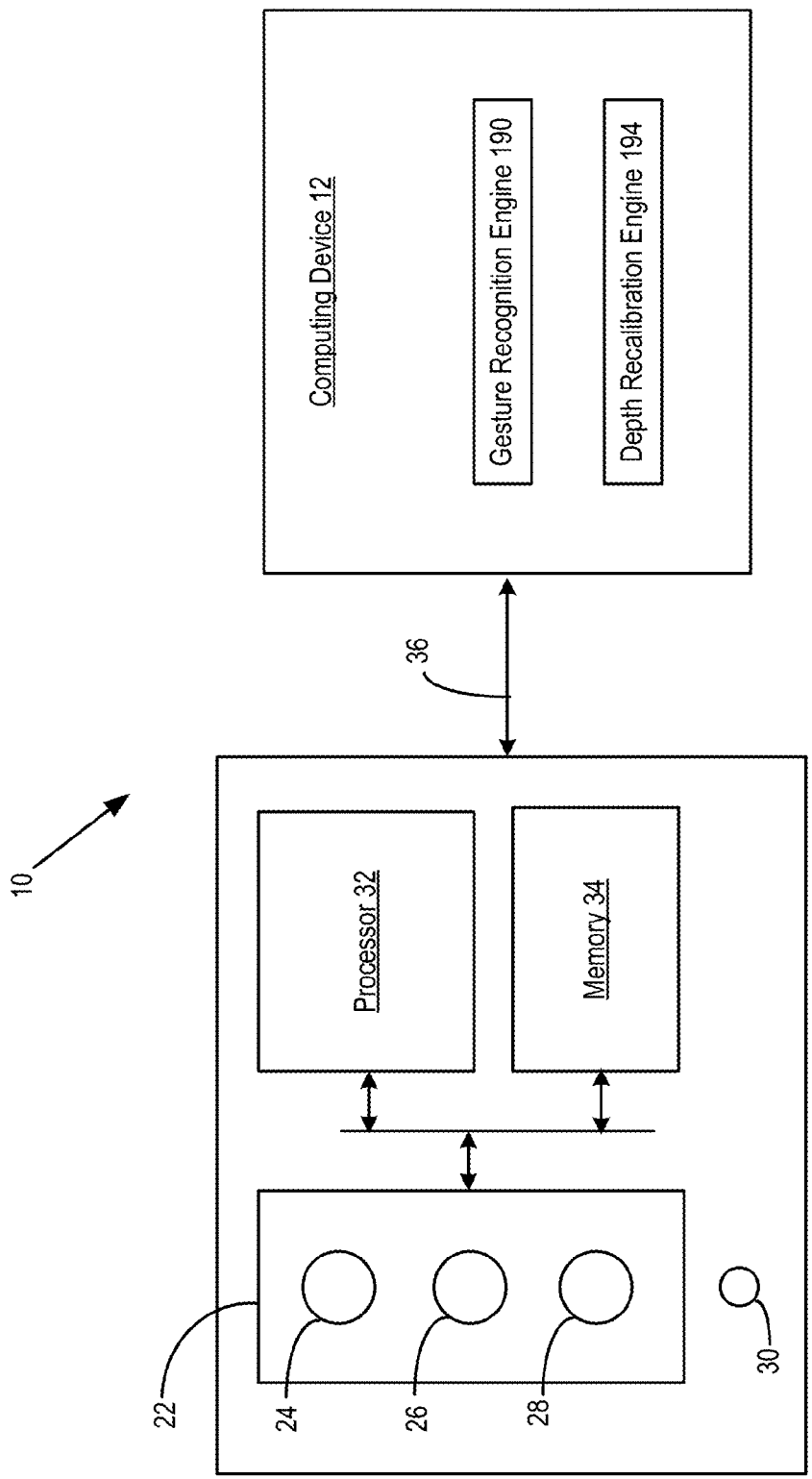
FIG. 3 illustrates an example embodiment of a capture device that may be used in a target recognition, analysis, and tracking system.

Referring initially to FIGS. 1-3, the hardware for implementing the present technology includes a target recognition, analysis, and tracking system 10 which may be used to recognize, analyze, and/or track a human target such as the user 18. Embodiments of the target recognition, analysis, and tracking system 10 include a computing environment 12 for executing a gaming or other application. The computing environment 12 may include hardware components and/or software components such that computing environment 12 may be used to execute applications such as gaming and non-gaming applications. In one embodiment, computing environment 12 may include a processor such as a standardized processor, a specialized processor, a microprocessor, or the like that may execute, instructions stored on a processor readable storage device for performing processes described herein.

The system 10 further includes a capture device 20 for capturing image and audio data relating to one or more users and/or objects sensed by the capture device. In embodiments, the capture device 20 may be used to capture information relating to movements, gestures and speech of one or more users, which information is received by the computing environment and used to render, interact with and/or control aspects of a gaming or other application. Examples of the computing environment 12 and capture device 20 are explained in greater detail below.

Embodiments of the target recognition, analysis and tracking system 10 may be connected to an audio/visual device 16 having a display 14. The device 16 may for example be a television, a monitor, a high-definition television (HDTV), or the like that may provide game or application visuals and/or audio to a user. For example, the computing environment 12 may include a video adapter such as a graphics card and/or an audio adapter such as a sound card that may provide audio/visual signals associated with the game or other application. The audio/visual device 16 may receive the audio/visual signals from the computing environment 12 and may then output the game or application visuals and/or audio associated with the audio/visual signals to the user 18. According to one embodiment, the audio/visual device 16 may be connected to the computing environment 12 via, for example, an S-Video cable, a coaxial cable, an HDMI cable, a DVI cable, a VGA cable, a component video cable, or the like.

In embodiments, the computing environment 12, the A/V device 16 and the capture device 20 may cooperate to render an avatar or on-screen character 19 on display 14. In embodiments, the avatar 19 mimics the movements of the user 18 in real world space so that the user 18 may perform movements and gestures which control the movements and actions of the avatar 19 on the display 14.

As shown in FIGS. 1 and 2, in an example embodiment, the application executing on the computing environment 12 may be a soccer game that the user 18 may be playing. For example, the computing environment 12 may use the audiovisual display 14 to provide a visual representation of an avatar 19 in form of a soccer player controlled by the user. The embodiment of FIG. 1 is one of many different applications which may be run on computing environment 12 in accordance with the present technology. The application running on computing environment 12 may be a variety of other gaming and non-gaming applications. Moreover, the system 10 may further be used to interpret user 18 movements as operating system and/or application controls that are outside the realm of games or the specific application running on computing environment 12. As one example shown in FIG. 2, a user may scroll through and control interaction with a variety of menu options presented on the display 14. Virtually any controllable aspect of an operating system and/or application may be controlled by movements of the user 18.

Suitable examples of a system 10 and components thereof are found in the following co-pending patent applications, all of which are hereby specifically incorporated by reference: U.S. patent application Ser. No. 12/475,094, entitled "Environment and/or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; U.S. patent application Ser. No. 12/391,150, entitled "Standard Gestures," filed Feb. 23, 2009; and U.S. patent application Ser. No. 12/474,655, entitled "Gesture Tool," filed May 29, 2009.

FIG. 3 illustrates an example embodiment of the capture device 20 that may be used in the target recognition, analysis, and tracking system 10. In an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 3, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 3, according to an example embodiment, the image camera component 22 may include an IR light component 24, a 3-D depth camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as a grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 20 to a particular location on the targets or objects.

According to another embodiment, the capture device 20 may include two or more physically separated cameras that may view a scene from different angles, to obtain visual stereo data that may be resolved to generate depth information. In another example embodiment, the capture device 20 may use point cloud data and target digitization techniques to detect features of the user.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 3, in one embodiment, the memory component 34 may be a separate component in communication with the image camera component 22 and the processor 32. According to another embodiment, the memory component 34 may be integrated into the processor 32 and/or the image camera component 22.

As shown in FIG. 3, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. A variety of known techniques exist for determining whether a target or object detected by capture device 20 corresponds to a human target. Skeletal mapping techniques may then be used to determine various spots on that user's skeleton, joints of the hands, wrists, elbows, knees, nose, ankles, shoulders, and where the pelvis meets the spine. Other techniques include transforming the image into a body model representation of the person and transforming the image into a mesh model representation of the person.

The skeletal model may then be provided to the computing environment 12 such that the computing environment may perform a variety of actions. The computing environment may further determine which controls to perform in an application executing on the computer environment based on, for example, gestures of the user that have been recognized from the skeletal model. For example, as shown, in FIG. 3, the computing environment 12 may include a gesture recognition engine 190 for determining when the user has performed a predefined gesture. Various embodiments of the gesture recognition engine 190 are described in the above incorporated applications. In accordance with the present system, computing device 12 may further include a depth recalibration engine 194 for determining a true measure of depth to one or more objects in a field of view (FOV) independently of the depth value provided by the depth camera 26, and then recalibrating the depth camera 26 to compensate for any deviation. Various embodiments of the depth recalibration engine 194 are described below.

As mentioned in the Background section, it may happen that the 3-D depth camera 26 may lose its calibration so that the depth measurements taken by the camera are not accurate. Inaccurate depth measurements can have several effects. In case of depth cameras used with gaming systems, such errors can make the user appear closer or farther than he really is. Alternatively, the user may appear shorter or taller than his actual height. Alternatively, the depth can widen the user in any axis, as well as skew and deform the user in any axis. A situation like this can easily make the software reach its limits. For example, if the software is limited to supporting users that are at least a certain height, a user which is improperly determined to be shorter than that will not be recognized by the software. The same can happen to a tall user at the opposite limit of the software's capability. Improper calibration of the depth camera 26 may result in a variety of other errors, distortions and complications.

In general, the present system therefore includes depth recalibration engine 194 for determining true depth measurements for one or more objects in the FOV. The depth recalibration engine 194 may then recalibrate the depth camera 26 (also referred to as the depth sensor) to compensate for any depth distortion. In straightforward embodiments, the depth sensor may simply be adjusted to the true depth determined by the depth recalibration engine 194. In further embodiments, more complex mathematical schemas may be developed to model depth error. The recalibration performed by the recalibration engine 194 may then correct the measured depth by minimizing the depth error. Various embodiments for the operation of depth recalibration engine 194 are set forth below.

Figure 4:
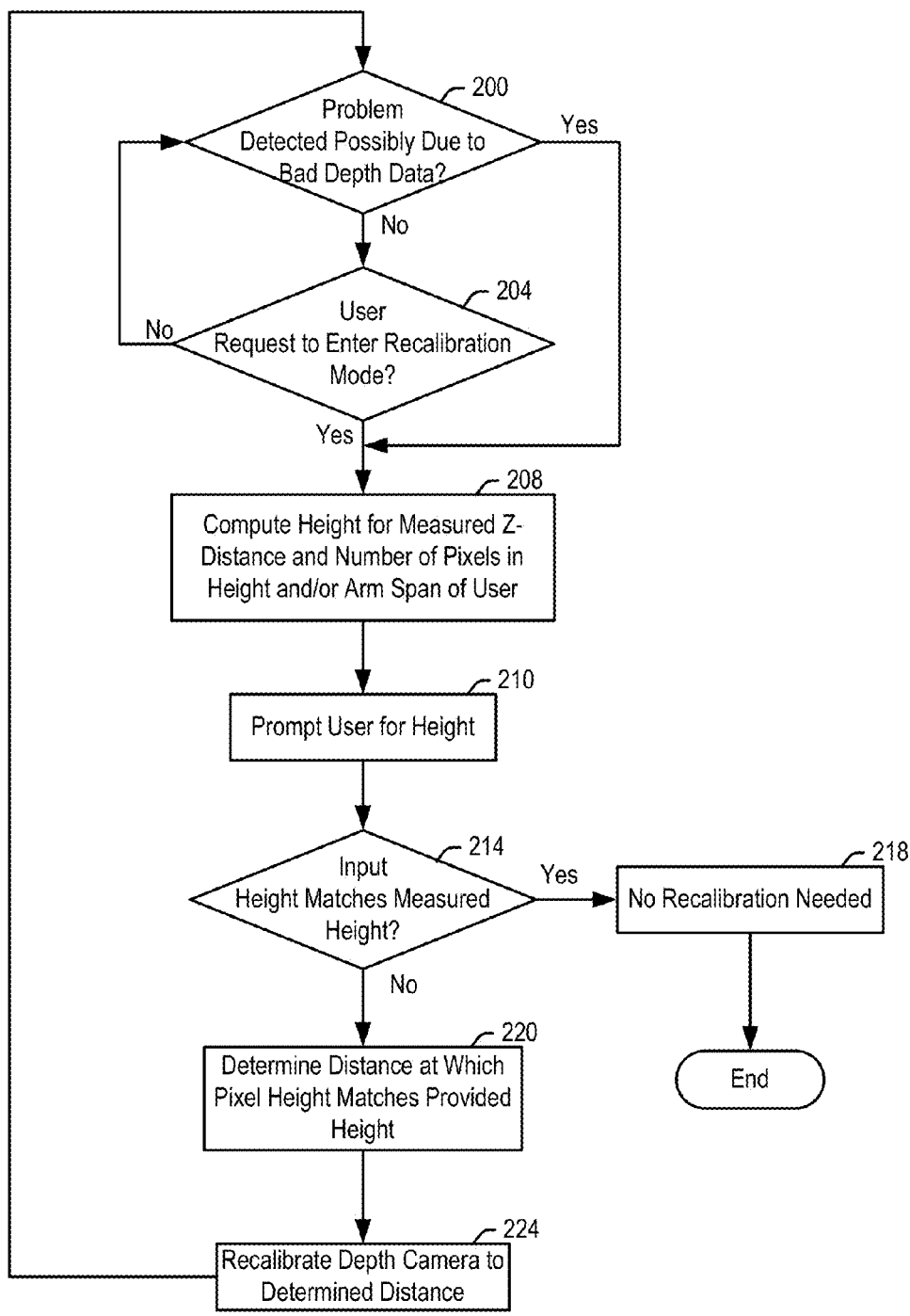
FIG. 4 is a flowchart for calibrating a depth sensor according to a first embodiment of the present technology.
Figure 5:
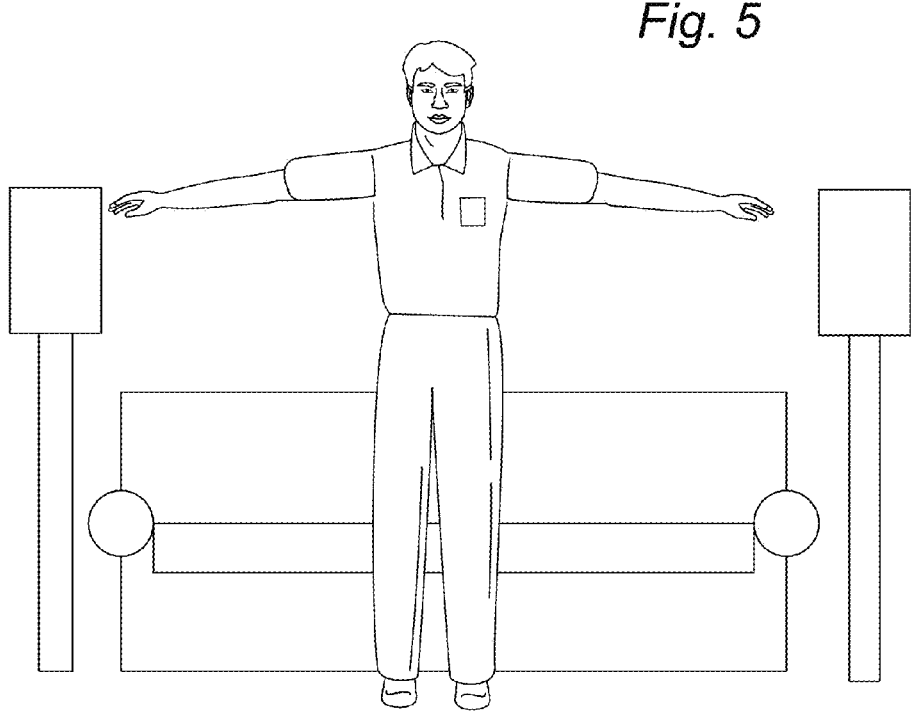
FIG. 5 is an illustration of a user in a field of view of a capture device.
Figure 6:
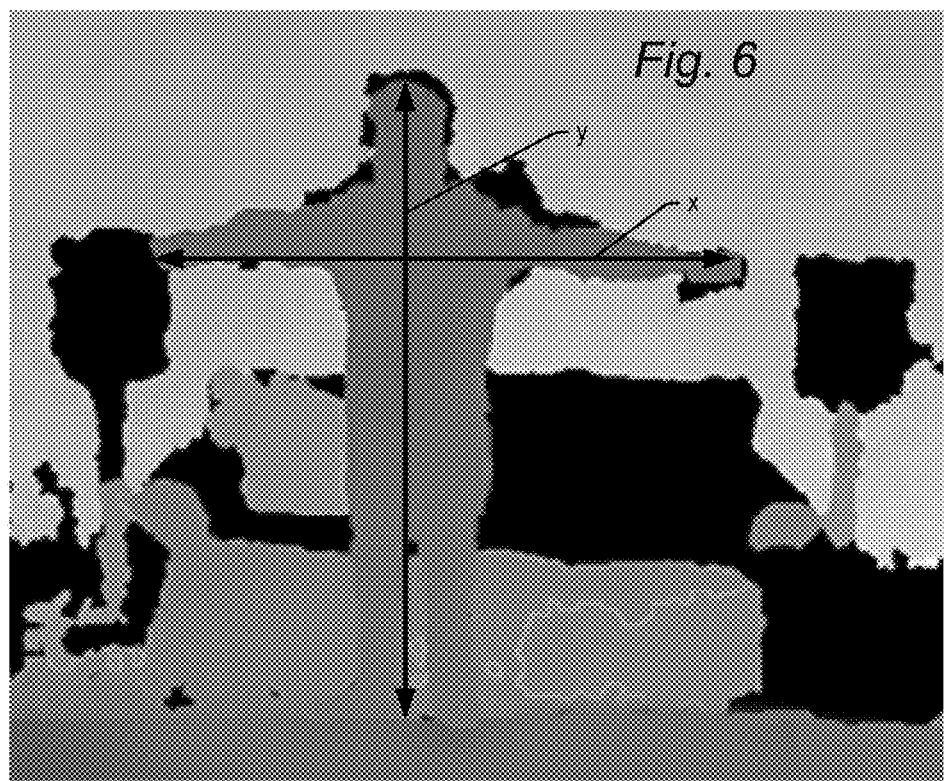
FIG. 6 is a depth image of the user of FIG. 5.
Figure 7:
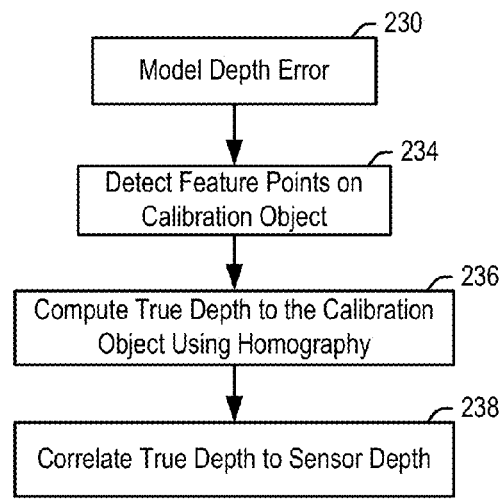
FIG. 7 is a high level flowchart for calibrating a depth sensor according to a second embodiment of the present technology.

In a first embodiment described with respect to FIGS. 4-6, the depth recalibration engine operates by a user inputting his or her height, and then determining whether the measured pixel height (or arm span) correlates to this height. Referring initially to the flowchart of FIG. 4, in step 200, the recalibration engine 194 detects a problem possibly resulting from incorrect depth data. If no such problem is detected by the engine 194, the system next checks in step 204 whether a user has indicated a desire to perform a recalibration operation. If a problem is detected in step 200, or if a user requests to enter recalibration mode in step 204, then the recalibration engine 194 performs a recalibration operation of the depth camera 26.

In step 208, the recalibration engine 194 computes a user's height based on the depth measurement of depth camera 26 and the number of pixels in the measured depth image. In particular, a user is prompted to stand in front of the capture device 20, as shown for example in FIG. 5. The number of pixels along the y-axis may then be determined from the 11-bit gray scale VGA depth map by thresholding. The data may be taken over a number of frames and averaged to determine the correct number of pixels in a user's height along the y-axis. In some embodiments, the user may also be prompted to extend their arms outward as shown in FIG. 5 and as explained below.

At each distance measured from the camera 26, there is a known correlation between the number of pixels in along a y-axis in the depth image, shown in FIG. 6, and the height of a user. For example, at 2.5 m, the system expects a 175 cm person to occupy 411 pixels along the y-axis. Thus, step 208 computes a user's expected height based on the measured depth and the number of pixels in the user's depth image along the y-axis. As explained below, the system may alternatively or additionally measure a user's "arm span," i.e., measured distance along an x-axis between the tips of the user's outstretched arms.

In step 210, the recalibration engine 194 may then prompt a user for his or her height. The step of prompting a user for height may occur before step 208 in further embodiments. The system may prompt a user for his height by a variety of methods via the NUI system 10. For example, the display 14 may have a virtual wheel or other visual indicator with a range of heights display. A user can swipe his or her hand or perform some other predefined gesture recognized by gesture recognition engine 190 until the appropriate height is displayed. A user may then select that height via another gesture. Alternatively, the user may verbally input their height.

In step 214, the recalibration engine determines whether the sensor height measured in step 208 matches the true height input by the user in step 210. If the heights match to within some tolerance, no recalibration is needed (step 218), and the recalibration engine 194 ends. On the other hand, if there is a disparity above some predefined tolerance, the recalibration engine determines the distance at which a user would be standing, based on the input height and the number of pixels along the y-axis in the depth image. The known relationship between pixels and height may then be corrected to the new relationship in step 224 to recalibrate the depth measurement of the camera 26. In embodiments, the steps 208 through 220 may be performed using a single sample. Alternatively, a user may be prompted to stand at a variety of different distances so that the system may have more data with which to adjust the relationship between y-axis pixels and height.

It may happen that it is difficult for the capture device to determine the location of a user's feet in an image (which is necessary to determine the lowermost pixels in the image and overall number of pixels along the y-axis). Even where the number of pixels along the y-axis is clear, it may be desirable to provide a confirmation of the measured values. Accordingly, in addition to or instead of using the number of pixels along the y-axis in the depth image of FIG. 6, the recalibration engine 194 may use the number of pixels along the x-axis between the tips of the user's outstretched arms. Using the measured arm span, and a known correlation between arm span the number of pixels measured for arm span at each depth distance, the system may determine depth distance as described above in step 208. The true arm span may be determined in step 210 by a user providing their height. Using a known correlation between height and arm span, the user's arm span may then be determined. For example, one known correlation may be that arm span=0.95 (height). The system may then compare the measured distance from the determined distance ins step 214 as described above.

In the embodiment described above, the object used to calibrate the depth camera 26 is the user's own body. In further embodiments, the steps 208 through 224 may be performed using an object other than the user's body for recalibration purposes. As long as the object is of fixed dimensions, which dimensions are known to the computing device 12, the system can determine a known relationship, at each distance, between the object dimensions and the number of pixels the object should take up along the x-axis and/or y-axis in the depth map. The object may for example be a piece of 8½×11 paper. Alternatively, the object may be a special calibration object provided with the system 10. Examples of such calibration objects are described below.

As indicated, the recalibration engine 194 may work by a variety of different methods. In one set of embodiments, the recalibration engine 194 relies on modeling depth camera error, and then using an object to infer the relationship between the depth properties measured by the depth camera and the real depth properties measured by one of a variety of methods and systems. As used herein, "sensor depth" refers to depth properties that are measured by the depth camera (which may require calibration), and "true depth" refers to the correct depth measured and/or computed by objective criteria. Depending on the nature and complexity of the depth camera error, and the feasibility in implementation of a given technique, there are various techniques that may be used to solve the problem and model depth error.

One set of techniques makes use of acquiring multiple sensor depth readings of a fixed sized object, where through some method, true depth measurements of the object can be acquired at the same time as the sensor depth is queried. Calibration is then achieved by the recalibration engine 194 by correlating the sensor depth with real depth by fitting the points to an error model that is known for the camera. The present technology does not limit the complexity of this model; it simply requires that enough samples are taken to fit the model through collected points. There are several ways for the true depth to be computed. Some examples explained below use a fixed size object for calibration where the size of the object is known. Another example explained below uses a fixed size object for calibration where the size of the fixed object is not known.

One technique of the recalibration engine 194 for modeling and compensating for camera error uses a fixed object of known size and RGB homography. Referring to the flowchart of FIG. 7, in general, this technique begins with mathematically modeling the error of the depth camera in step 230. In step 234, this technique then detects feature points on a fixed calibration object of known size, which may for example be a card referred to herein as a calibration card. This technique then computes true depth of the calibration card using homography in step 236. The true depth is then correlated to the sensor depth reading taken by the depth camera in step 238. Further details of these steps are provided below.

In this example, the process begins with a mathematical model of the error in step 230. For a given capture device 20, it is possible to estimate the error using a linear model, describing the error using two variables, alpha ($\alpha$) and beta ($\beta$) where:

$$Z_{sensor\ depth} = \alpha(Z_{true\ depth}) - \beta. \tag{1}$$

Figure 8:
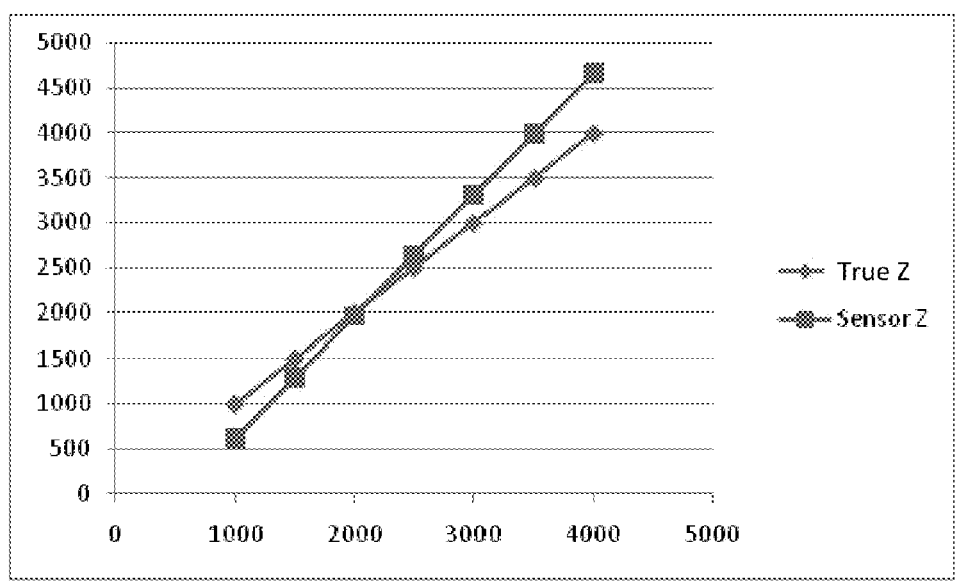
FIG. 8 is a graph of sample points measured by a depth sensor and the true determined depth of the same sample points.
Figure 9:
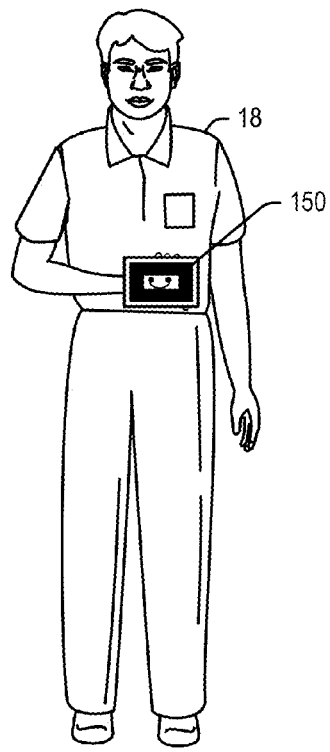
FIG. 9 is an illustration of a user holding a calibration object positioned in a field of view of a capture device.

FIG. 8 demonstrates a linear error reading where the depth sensor is measured at various distances and compared against the true depth. The $\beta$ component represents the depth at which the sensor and the true depth are equal (the intercept), and $\alpha$ represents the slope of the line. By computing both of these values, the incoming sensor depth can be converted into real depth, by inverting the error.

The example shown uses a linear error function, because it reduces the work needed from the user in obtaining depth measurements at different points and calibrates the depth camera 26 to acceptable levels. However, it is understood that more complex and non-linear error functions may alternatively be used.

Figure 10:
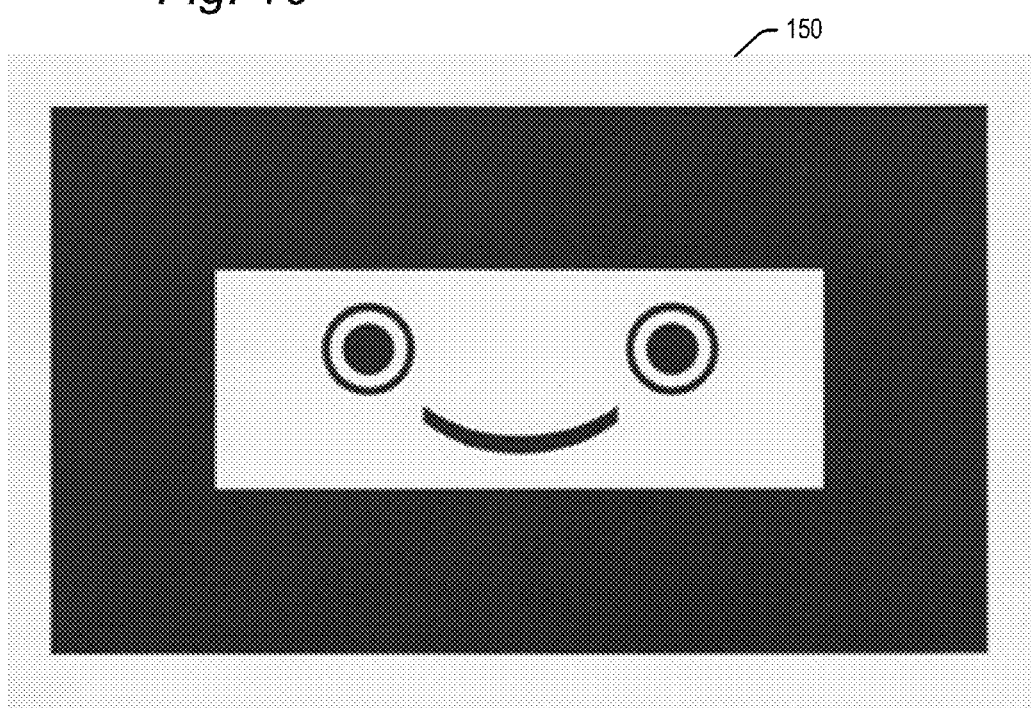
FIG. 10 is an enlarged view of the calibration object.
Figure 11:
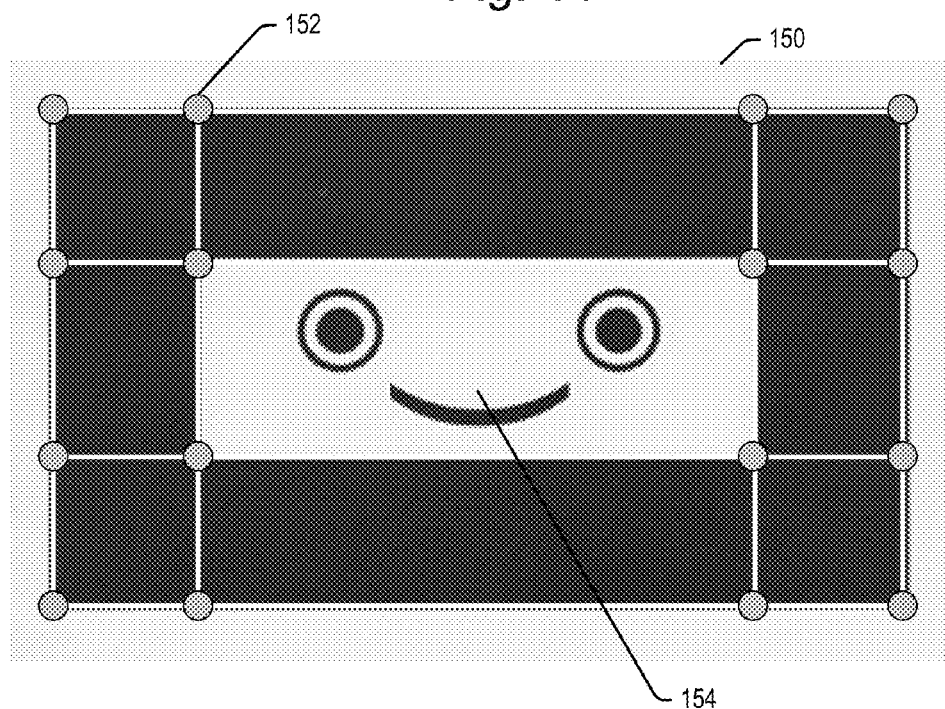
FIG. 11 is an enlarged view of the calibration object showing reference points which may be identified by the capture device.

With regard to detection of feature points in the calibration card in step 234, the RGB homography method requires a set of image feature points for which real world measurements can be obtained. An example of a calibration object in the form of a calibration card 150 is shown held by a user 18 in FIG. 9, and an enlarged view of the calibration object 150 is shown in FIG. 10. As shown in FIG. 11, the calibration card 150 has 16 feature points 152, each at the intersections of the borders of the different colored regions in the card 150. The calibration card 150 may also have a user-guidance image 154, which in the example shown is in the shape of a face. The purpose of user-guidance image 154 is explained below. The calibration card 150 shown in the figures is simply one example of a calibration object which may be used. In further embodiments, the calibration object may be a card or other object having a variety of other feature points for the purpose described below. The size of the card and the distance between feature points may be known. The user-guidance image 156 may be other image objects or may be omitted.

Figure 12:
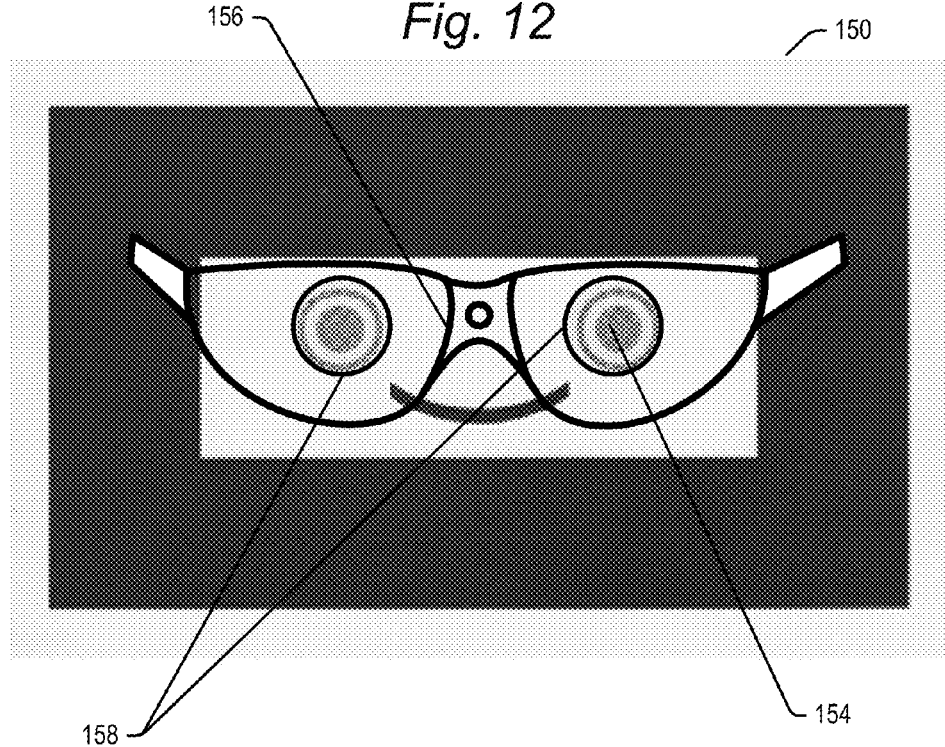
FIG. 12 is a view of the calibration object displayed to the user with a target for positioning the calibration object at a certain depth from the capture device.

While there are known techniques for finding the feature points 152 using the capture device 20, a sample feature point algorithm may be used to identify the feature points at different depth measurements. An example of the operation of the sample feature point algorithm are described with respect to the flowchart of FIG. 13. One advantage to the sample feature point algorithm is that it makes it simple for users to provide the samples and its robustness. In a step 250, a user is prompted to hold the calibration card 150 a given distance from the capture device 20. In one example, the computing device 12 may display a pair of glasses 156 on display 14 as shown in FIG. 12. The glasses 156 may include a pair of circular targets 158 spaced apart a given distance.

An image of the calibration card 150 including user-guidance image 154 is displayed on the screen. The size of the user-guidance image 154 will depend on how far the card 150 is positioned from the capture device 20. Where the user is far away, the displayed card will be relatively small and the eyes of the user-guidance image 154 will be relative close together. Conversely, where the user is close, the displayed card will be relatively large and the eyes of the user-guidance image 154 will be relative far apart. The user is asked to roughly fit the eyes from user-guidance image 154 into the two targets 158, as shown in FIG. 12. The size of the glasses 156 displayed on the display 14 will vary for different samples, based on the desired distance of the card from the capture device for a given sample. Thus, the spacing between the targets 158 will generally dictate how close or far the card 150 is held from capture device 20.

By adjusting the size of that target, the user is forced to hold the card at different "distance buckets." The user is asked to hold the card at several general distances, for example, 1.4 m, 1.7 m, 2.1 m and 2.5 m. (if the user has that much room). Having more buckets produces a more accurate calibration, but is not mandatory. The user-guidance image 154 and targets 158 are merely one example of a method for easily prompting a user to position the calibration card an approximate distance from the capture device 20. It is appreciated that a wide variety of other methods may be used whereby a user 18 is prompted to position the calibration card 150 at different distances from the capture device 20. It is not critical that the distances be precise. The method merely provides for diverse distance measurements.

Once the calibration card is positioned at a give distance for a sample, the image of the calibration card captured by the RGB camera 28 is converted in step 254 into a luminance image for processing. The luminance image may then be thresholded in step 258 to separate white from black in step 258. One method of thresholding to black and white is disclosed in the publication to Nobuyuki Otsu, entitled "A threshold selection method from gray-level histograms," *IEEE Trans. Sys., Man., Cyber.* 9: 62-66. (1979), which publication is incorporated by reference herein in its entirety. This technique allows the algorithm to be more lighting independent, specifically the behavior of the edge detection, but other algorithms may be used to separate the white from black in the converted RGB luminance image.

With the eyes from user-guidance image 154 aligned within targets 158, a circle finding algorithm is run on the area inside the glasses in step 262 to determine the location of the eyes within the targets 158. Circle finding algorithms such as a Hough transform may be used, such as described in U.S. Pat. No. 3,069,654 to Hough entitled, "Method And Means For Recognizing Complex Patterns," which patent is incorporated by reference herein in its entirety. Other circle finding algorithms may be used. Where other shapes are used in user-guidance image 154, these shapes may be similarly identified by known algorithms. The location of the eyes in the luminance map space provides an estimate of the location and distance of the calibration card 150. This allows guidance of feature detection making it more robust. In particular, given the eye proposal, the size and position of the card is estimated in luminance image space.

For each calibration card border edge, lines may be detected in step 264, for example by running a line detector algorithm in a window where the edges are expected. In the calibration card 150 of this example, this generates eight lines. The algorithm confirms that eight lines found contain four horizontal and four vertical lines. The algorithm next intersects the four horizontal and four vertical lines against each other in step 268 to generate 16 points.

Identification of the 16 points generates an estimate of where the card is. The algorithm may double check for false positives in step 270 by using template matching. With the estimate of the location/size of the card, a check is performed to confirm the pixels are black/white where they are expect to be. If this passes a threshold, the feature points are considered valid and are passed to a homography algorithm, from which a true depth value of the center of the card may be computed, together with an error value. The homography algorithm is described below.

Figure 13:
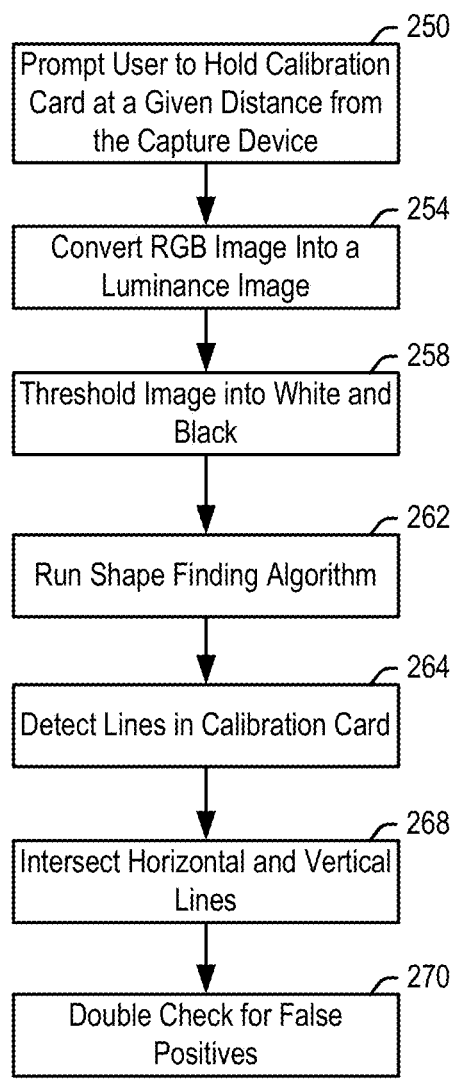
FIG. 13 is a flowchart for detecting points in the calibration object.

Using the above technique together with the homography algorithm, alpha and beta may be computed in order to perform depth correction. Steps 250 through 270 of FIG. 13 provide some number of depth buckets each of which contains a small set of true/sensor depth pairs. As explained below, the point sets may be run through a least square line fit to generate a linear estimate of the error. The alpha and beta components are extracted from this line, and are used to convert sensor depth to real depth, calibrating the camera.

Figure 14:
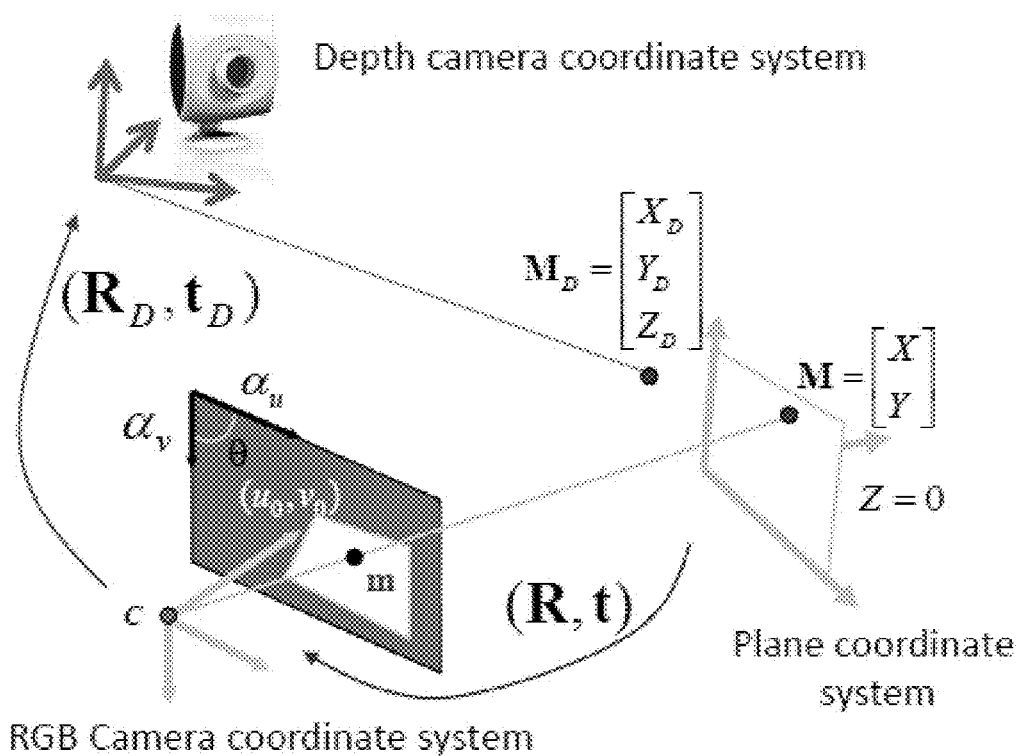
FIG. 14 is an illustration of a plane of the calibration object relative to a coordinate system of the depth camera and relative to a coordinate system of the RGB camera.

In general, the homography algorithm performs a transformation from a reference plane in which the points of the calibration card 150 lie to the reference systems of the depth camera 26 and RGB camera 28. These various geometric relations are shown in FIG. 14. Assuming the z-plane of the plane coordinate system coincides with the plane of calibration card 150. A point on the plane is denoted by $M=[X; Y; 0]^T$ with the z-component equal to 0. The plane coordinate system is related to the RGB camera coordinate system by rotation R and translation t, and the point M in the RGB camera coordinate system is given by $$M_C = \mathcal{R}M + t. \tag{2}$$

The point M is projected to the image plane at $m=[u; v]^T$. The RGB camera 28 coordinate system is related to the depth camera 26 coordinate system by rotation $R_D$ and translation $t_D$, and the point M in the RGB camera coordinate system is given by $$M_D = \mathcal{R}_D M_C + \mathcal{R}_D \mathcal{R} M + \mathcal{R}_D t + t_D \tag{3}$$

Here, $R_D$ and $t_D$ are determined at the manufacture of the capture device 20, and are assumed not changed.

Figure 15:
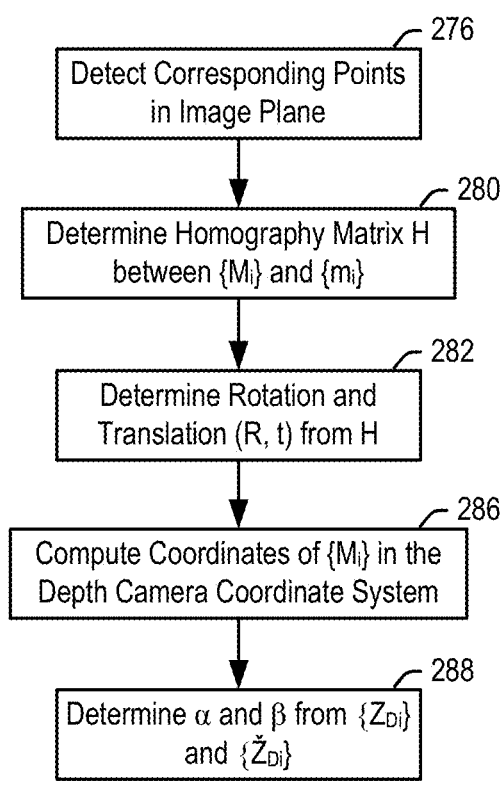
FIG. 15 is a flowchart for translating points in the plane of the calibration object to a reference frame of the RGB camera and then determining an error function based on the sample points measured by the RGB camera.

Given these definitions, the recalibration of the depth camera 26 may be performed by following the steps shown in FIG. 15. In particular, given a set of known points $\{M_i\}$ (at least 4) on a plane of calibration card 150, and their measured depth values $\{\check{Z}_{Di}\}$ provided by the depth camera 26, where "ˇ" is used to denote the measure sensor depth value, recalibration may be performed by a step 276 of detecting corresponding points in the image plane of calibration card 150, denoted by $\{m_i\}$. In step 280, the algorithm homography algorithm determines the homography matrix H between $\{M_i\}$ and $\{m_i\}$. In step 282, the homography algorithm determines the rotation and translation (R, t) from H. In step 286, the algorithm computes the coordinates $\{M_i\}$, denoted by $\{M_{Di}\}$, in the depth camera 28 coordinate system, using equation (3). And in step 288, α and β are determined for use in the error function of equation (1) from $\{Z_{Di}\}$ (which is the z component of $M_{Di}$) and $\{\check{Z}_{Di}\}$. The mathematical support for these calibration steps is set forth below.

The constraints on the depth camera's intrinsic parameters may be examined with respect to a single plane, e.g., the plane of calibration card 150. A 2D point on the plane is denoted by $m=[u; v]^T$. A 3D point on the plane is denoted by $M=[X; Y; Z]^T$. $\tilde{x}$ may be used to denote the augmented vector by adding 1 as the last element: $\tilde{m}=[u; v; 1]^T$ and $\tilde{M}=[X; Y; Z; 1]^T$. A camera is modeled by the usual pinhole: the relationship between a 3D point M and its image projection m is given by $$s\tilde{m} = A[\mathcal{R} \ t]\tilde{M} \tag{4}$$

where s is an arbitrary scale factor; (R, t), called the extrinsic parameters, is the rotation and translation which relates the world coordinate system to the camera coordinate system; and A, called the camera intrinsic matrix, is given by $$A = \begin{bmatrix} \alpha_u & \alpha_u \cot\theta & u_0 \\ 0 & \alpha_v & v_0 \\ 0 & 0 & 1 \end{bmatrix}$$

with $(u_0; v_0)$ being the coordinates of the principal point, $\alpha_u$ and $\alpha_v$ being the scale factors in image u and v axes, and θ being the parameter describing the angle of the two image axes (usually very close to 90). The abbreviation $A^{-T}$ is used for $(A^{-1})^T$ or $(A^T)^{-1}$.

With regard to the homography between the model plane and its image, it may be assumed that the model plane is on Z=0 of the world coordinate system. The ith column of the rotation matrix R may be denoted by $r_1$. From (4) therefore:

$$s\begin{bmatrix} u \\ v \\ 1 \end{bmatrix} = A[r_1 r_2 r_3 t] \begin{bmatrix} X \\ Y \\ 0 \\ 1 \end{bmatrix}$$

$$= A[r_1 r_2 t] \begin{bmatrix} X \\ Y \\ 1 \end{bmatrix}$$

M still may be used to denote a point on the model plane, but $M=[X, Y]^T$ since Z is always equal to 0. In turn, $\tilde{M}=[X, Y,1]^T$. Therefore, a model point M and its image m is related by a homography H:

$$s\tilde{m} = H\tilde{M} \text{ with } H = A[r_1 r_2 t] \tag{5}$$

The 3×3 matrix H is defined up to a scale factor.

Using the above, the homography between the model plane and its image may be estimated in a variety of ways. One technique may be based on maximum likelihood criterion. Let $M_i$ and $m_i$ be the model and image points, respectively. Ideally, they should satisfy (5). In practice, they may not because of noise in the extracted image points. If it is assumed that $m_i$ is corrupted by Gaussian noise with means 0 and covariance matrix $\Lambda m_i$. Then, the maximum likelihood estimation of H is obtained by minimizing the following functional $$\Sigma_i(m_i - \hat{m}_i)^T \Lambda_{m_i}^{-1}(m_i - \hat{m}_i),$$

where $$\hat{m}_i = \frac{1}{\bar{h}_3^T M_i} \begin{bmatrix} \bar{h}_1^T M_i \\ \bar{h}_2^T M_i \end{bmatrix}$$

with $\bar{h}_i$, the ith row of H.

In practice, it may be assumed that $\Lambda m_i = \sigma^2 I$ for all i. This is reasonable if points are extracted independently with the same procedure. In this case, the above problem becomes a nonlinear least-squares one, i.e., $\min_H \Sigma_i \|m_i - \hat{m}_i\|^2$. The nonlinear minimization is conducted with the Levenberg-Marquardt Algorithm as implemented in Minpack. See, for example, the publication by J. More, "The Levenberg-Marquardt Algorithm, Implementation and Theory," *Numerical Analysis*, Lecture Note in Mathematics p. 630, Springer-Verlag (1977), which publication in incorporated by reference herein in its entirety.

This nonlinear minimization requires an initial guess, which can be obtained as follows. Let $x = [\bar{h}_1^T, \bar{h}_2^T, \bar{h}_3^T]^T$. Then equation (5) can be rewritten as:

$$\begin{bmatrix} \tilde{M}^T & O^T & -u\tilde{M}^T \\ O^T & \tilde{M}^T & -v\tilde{M}^T \end{bmatrix} x = 0$$

Where there are n points, there are n above equations, which can be written in matrix equations as $Lx=0$, where L is a 2n×9 matrix. As x is defined up to a scale factor, the solution is well known to be the right singular vector of L associated with the smallest singular value (or equivalently, the eigenvector of $L^T L$ associated with the smallest eigenvalue).

In L, some elements are constant 1, some are in pixels, some are in world coordinates, and some are multiplications of both. This makes L poorly conditioned numerically. Alternative results can be obtained by performing a simple data normalization, for example, the image coordinates can be normalized to the range (−1,1) and the coordinates of the points on the plane can also be in the range (−1, 1) using appropriate unit comparable to the plane size.

The above may be used to determine the rotation and translation from the homography. Once H is obtained, since the intrinsic parameters of the camera A is known, from (5), the result is:

$$r_1 = \lambda A^{-1} h_1 \tag{6}$$

$$r_2 = \lambda A^{-1} h_2 \tag{7}$$

$$r_3 = r_1 \times r_2 \tag{8}$$

$$t = \lambda A^{-1} h_3 \tag{9}$$

with $\lambda = 1/\|A^{-1} h_1\| = 1/\|A_{-1} h_2\|$. Because of noise in the data, the so-computed matrix $Q = [r_1, r_2, r_3]$ does not in general satisfy the properties of a rotation matrix.

The problem considered below is to solve the best rotation matrix R to approximate a given 3×3 matrix Q. Here, "best" is in the sense of the smallest Frobenius norm of the difference R−Q. That is, the following problem is being solved:

$$\min_R \|R - Q\|_F^2 \text{ subject to } R^T R = I \tag{10}$$

Since $$\|R - Q\|_F^2 = \text{trace}((R - Q)^T (R - Q))$$

$$= 3 + \text{trace}(Q^T Q) - 2\text{trace}(R^T Q),$$

problem (10) is equivalent to the one of maximizing trace ($R^T Q$).

Let the singular value decomposition of Q be $USV^T$, where $S = \text{diag}(\sigma_1, \sigma_2, \sigma_3)$. If an orthogonal matrix Z by $Z = V^T R^T U$ is defined, then $$\text{trace}(R^T Q) = \text{trace}(R^T USV^T)$$

$$= \text{trace}(V^T R^T US)$$

$$= \text{trace}(ZS)$$

$$= \sum_{i=1}^{3} z_{ii} \sigma_i \le \sum_{i=1}^{3} \sigma_i.$$

The maximum is achieved by setting $R = UV^T$ because then Z=I. This gives the solution to (10).

In the above paragraphs, the rotation and translation is estimated through the estimation of the homography matrix. This estimation can be refined through maximum likelihood inference. Assume that an image point $m_i$ is corrupted by noise with mean 0 and covariance matrix $\Lambda m_i$. Then, the maximum likelihood estimation of (R, t) can be obtained by minimizing the following functional $$\Sigma_i(m_i - \hat{m}(R,t,M_i))^T \Lambda_{m_i}^{-1}(m_i - \hat{m}(R,t,M_i)), \tag{11}$$

where $\hat{m}(R, t, M_i)$ is the projection of point $M_i$ in the image plane, according to equation (5). A rotation R is parameterized by a vector of 3 parameters, denoted by r, which is parallel to the rotation axis and whose magnitude is equal to the rotation angle. R and r are related by the Rodrigues formal. See for example the publication by Z. Zhang et al. "3D Dynamic Scene Analysis: A Stereo Based Approach," Springer, Berlin, Heidelberg (1992). Minimizing (11) is a nonlinear minimization problem, which is solved with the Levenberg-Marquardt Algorithm as implemented in Minpack, as described above.

Another method performed by the recalibration engine 194 of determining an error model for recalibration purposes is referred to as "screen space measurement" and is now described with respect to FIGS. 16-22. In general, the screen space measurement looks at points on an object, such as the calibration object 150 discussed above, and determines how the measured depth values deviate from the true depth values. This technique then attempts to define an error model that explains the deviation. This technique take into consideration two effects of measurement error: scaling, which affects all dimensions equally and is independent of the location in space, and spatial distortion, which is scaling that draws a dependency on one or more of the spatial coordinates. The ideal system has a scaling factor of 1 and no spatial distortion. In practice, depth measurement error causes the system to vary from the ideal.

Figure 16:
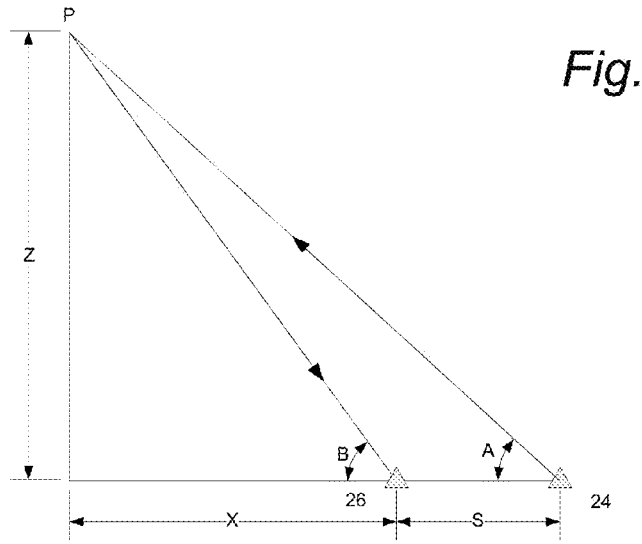
FIG. 16 is a top view of a light ray projected from a projector, reflecting off of a sample point and incident on the depth sensor.

FIG. 16 is a top view illustrating a projector, which may for example be IR light component 24, and an imager, which may for example be depth camera 26. The depth (Z) of a pixel (P) is determined by the distance, S, between the projector 24 and imager 2, and the angles A and B. FIG. 16 is a plane view from above the camera field of view. Light from the projector is reflected by an object at point P, which is then incident upon the imager. The angles A and B can be related to the projected image and the imager based on pattern recognition and the location of the pixel in the field of view. The distance S is a constant for the depth imager. From FIG. 16, the following trigonometric relationship can be derived:

$$\tan(A) = \frac{Z}{X+S}$$

$$\tan(B) = \frac{Z}{X}$$

$$\frac{Z}{\tan(B)} = \frac{Z}{\tan(A)} - S$$

$$S = \frac{Z}{\tan(A)} - \frac{Z}{\tan(B)}$$

$$Z = \frac{S}{\left[\frac{1}{\tan(A)} - \frac{1}{\tan(B)}\right]}$$

As noted, depth error can be introduced into the system due to an angular shift of the projector, in the top-down plane view, relative to the position it was when the system was calibrated. Such a shift would constitute a misalignment of the optical axes of the projector and imager relative to their calibrated positions. In FIG. 16, the calibrated depth imager reports the depth of an object at point P as the sensor depth.

If, after calibration, the projector is offset by an angle E, the same ray of the projected pattern incident on point P' would return along the same path as the previous calibrated case, resulting in a reported depth equivalent to the point P in the calibrated case. Hence, after the post-calibration shift, the depth of point P', which is located at the true depth=Zactual and laterally at dimension Xactual, is reported as Zreported and)(reported. The difference between P and P' is the resultant reporting error.

Using the previous relationships between the two angles (B and A-E) and the depth Z, the following can be proved:

$$\frac{Z}{\tan(B)} = \frac{Z}{\tan(A)} - S$$

$$\tan(A) = \frac{Zreported}{\frac{Zreported}{\tan(B)} + S}$$

$$\tan(A) = \frac{Zreported\tan(B)}{Zreported + S\tan(B)}$$

$$Zactual = \frac{S}{\frac{1}{\tan(A-E)} - \frac{1}{\tan(B)}}$$

Applying the trig identity for the tangent of a difference of two angles and algebra, this reduces to:

$$\tan(A-E) = \frac{\tan(A) - \tan(E)}{1 + \tan(A)\tan(E)}$$

$$Zactual = S \frac{[Zreported*(\tan(B) - \tan(E)) - S\tan(B)\tan(E)]}{Zreported\left[(\tan(B)\tan(E) + \frac{\tan(E)}{\tan(B)}\right] + S[\tan(B) + \tan(E)]}$$

$$Zactual = \frac{ZreportedS[1 - \tan(E)\cot(B)] - S^2\tan(E)}{Zreported\tan(E)[1 + \cot^2(B)] + S[1 + \tan(E)\cot(B)]}$$

Solving for Zreported and moving tan(B) factor to the denominator of each term:

$$Zreported = \frac{[Zactual[\tan(B) + \tan(E)] + S[\tan(B)\tan(E)]]}{\tan(B) - \tan(E) - \frac{Zactual}{S}\left[\tan(B)\tan(E) + \frac{\tan(E)}{\tan(B)}\right]}$$

$$Zreported = \frac{Zactual[1 + \tan(E)\cot(B)] + S\tan(E)}{1 - \tan(E)\cot(B) - \frac{Zactual\tan(E)}{S}[1 + \cot^2(B)]}$$

The angle B is derived from the pixel position on the imager which is a function of X and Z in the real world coordinate system. In one example of capture device 20, S is a constant of 75 mm, and E is the relative angular offset between the imager and projector post-calibration. Positive values of E correspond to the projector "toeing-in" toward the imager, negative values correspond to "toe-out."

Figure 18:
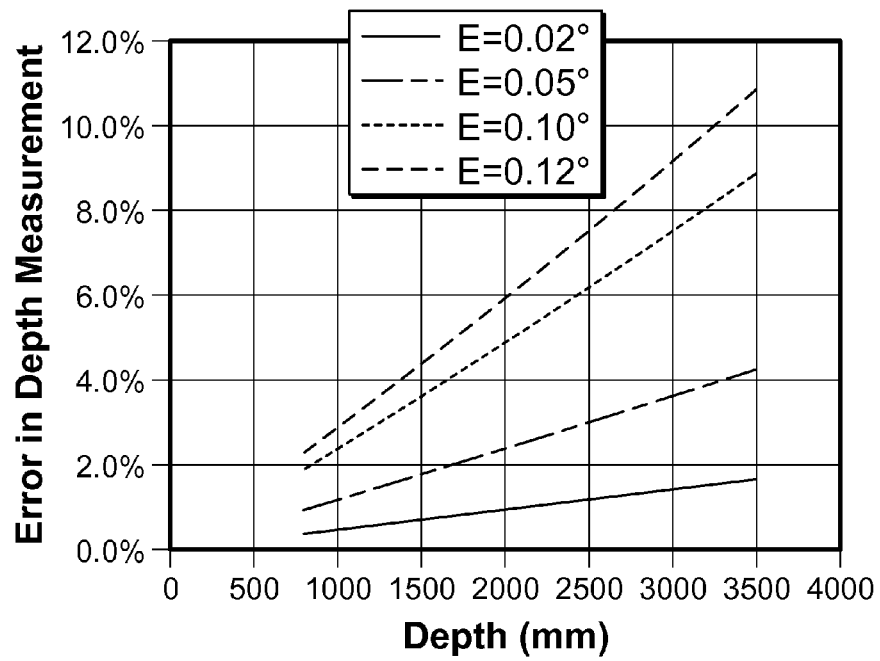
FIG. 18 is a graph of depth error over a range of error angles E.

When inspecting the behavior of depth error measurement over various conditions, errors in reporting depth affect the X and Y transformations from depth map space to world space in the same proportion. It may be observed that the error in depth is not constant across range (Zactual) or FOV (B), and is in fact a nonlinear relationship. However, for very small angular offsets, i.e., fractions of a degree, the resulting error is very nearly linear as a function of range. The chart of FIG. 18 depicts the variation in center-tile range error over the specified range of the capture device 20 for various values of the angle E from 0.02° to 0.12°.

Figure 19:
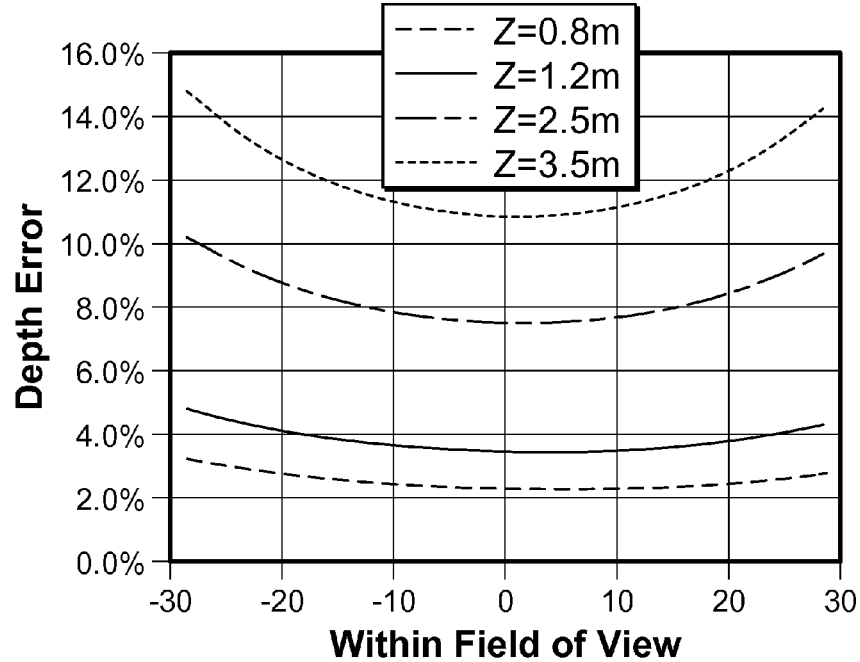
FIG. 19 is a graph of a depth error across the field of view.

FIG. 19 demonstrates the variation in depth error across the FOV of the imager at a fixed distance of 3.5 m and an error angle E=0.12°. The error is least in the center of the FOV, and grows nearly 50% at the extreme edges. Also of note is the non-symmetrical nature across the FOV due to the bias of the projector being located to one side of the imager, which shows up in the math as a non-symmetrical range of angles A.

The generalized transformation of the imager pixel (Px, Py) with depth Z to world coordinates (X, Y, Z) is in the form:

$$X(Px, Z) = Z\left[\frac{2Px}{Nx} - 1\right]\tan\left(\frac{FOVx}{2}\right)$$

$$Y(Py, Z) = Z\left[\frac{2Py}{Ny} - 1\right]\tan\left(\frac{FOVy}{2}\right)$$

In these transforms Nx is a constant defining the number of pixels spanning the FOV and the FOVx is the angular field of view in the Z-X plane; similar definitions apply to Ny and FOVy. If the depth measurement error were independent of real-world spatial coordinates, then the sensitivity of X, Y, and Z would all be equivalent, and hence there would be no spatial distortion in the transformation, only scaling. As shown earlier, for the case where measurement error is due to a misalignment of the optical elements, the depth error is a function of both the Z and X coordinates, and hence some amount of spatial distortion can be expected as a result.

Figure 20:
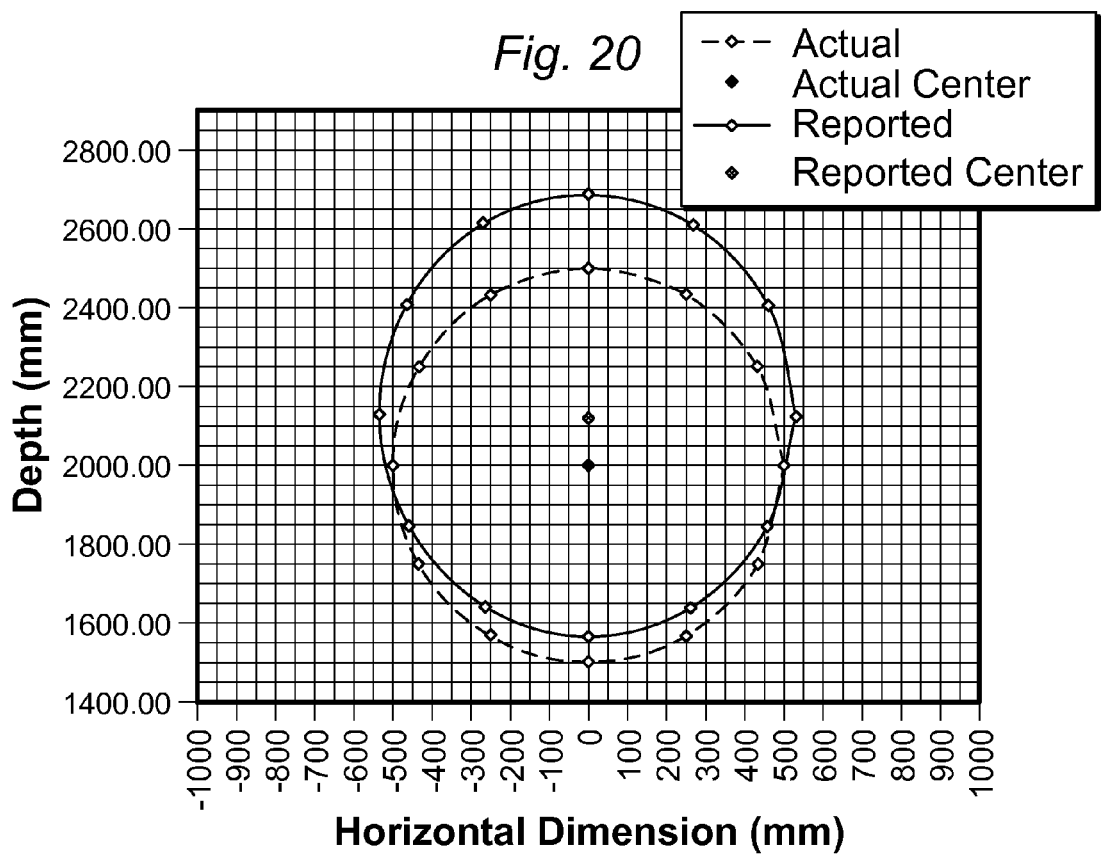
FIG. 20 is a graph of points of an object measured by an operation for determining true depth of the points, and the same points measured by the depth sensor and distorted by a depth error.
Figure 21:
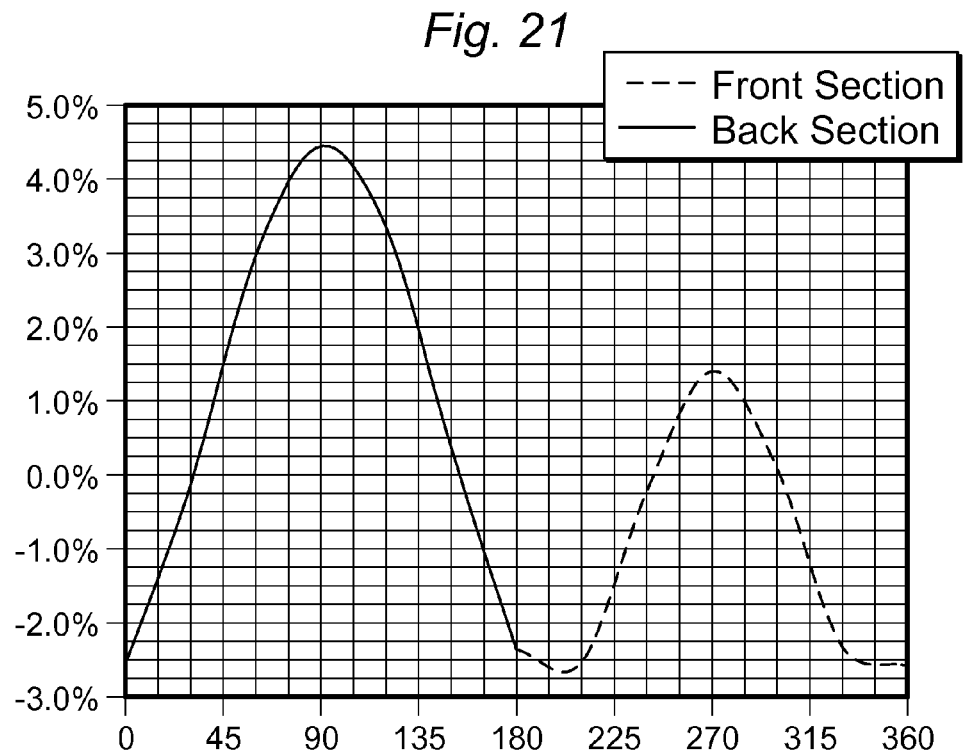
FIG. 21 is a graph showing the degree and location of the distortion in the graph of FIG. 20.

Using the generalized representation of misalignment effects on depth measurement, the resulting spatial distortion can be modeled. FIG. 20 compares the actual and reported positions of an object rotated in the Z-X plane, the chart being a plot of the Z (depth) and X (horizontal dimension) axes. The actual path is a 500 mm radius about a point 2 m from the depth sensor 26; the sensor 26 has a modeled error angle E=0.12°. The depth error in this case is approximately 10.8% at 3.5 m. The circle appears to be slightly wider and further away from the sensor, is slightly oval rather than round, and is also to some degree asymmetrical.

The average reported radius of the circle in this example is 545 mm, the extent of the out-of-roundness of the reported circle is +4.5% to −2.6%, however, it is notable that the greater distortion is in the rearmost extent of the circle. If only the front-facing portion of the circle is evaluated, the extent of the distortion is reduced to +1.4% and −2.6%. This can be seen in the below graph of FIG. 21. It is understood that the illustrations, graphs and charts of FIGS. 16-21 are by way of example only, and may vary in further embodiments.

If a sensor can be calibrated to a minimal distortion level at the factory, and if it can be assumed that the chief contributor to distortion in the field is optical misalignment from environmental and use factors such as temperature, drop shock, and aging, then it may be possible to implement in-field compensation by noting how the measured sizes of objects of vary through the play space.

In the previous spatial distortion example shown in FIG. 20, the size of the circle appears larger at greater depth than at closer depth. In the course of performing skeletal tracking the length of a fixed object, if a forearm, for example, is observed to shorten at close distances and lengthen at longer distance, a compensating computational step can be added to the depth information to counter the effect of the toe-in condition. If this step is implemented in the generalized form with a global parametric value for E, the algorithm can try successively larger or smaller values of E in response to whether objects appear relatively larger or smaller in the foreground. The range of possible values of E can be constrained to represent what may be expected in the field. For example, a range of −0.12° to +0.12° with steps of 0.02° would be sufficient to cover the range of error we would normally associate with a camera of +10% error at 3.5 m.

In this way, in-field compensation can be performed in real time and adapt to various conditions that might affect absolute accuracy as well as relative distortion. If successful, both relative distortion and absolute accuracy improve.

Figure 17:
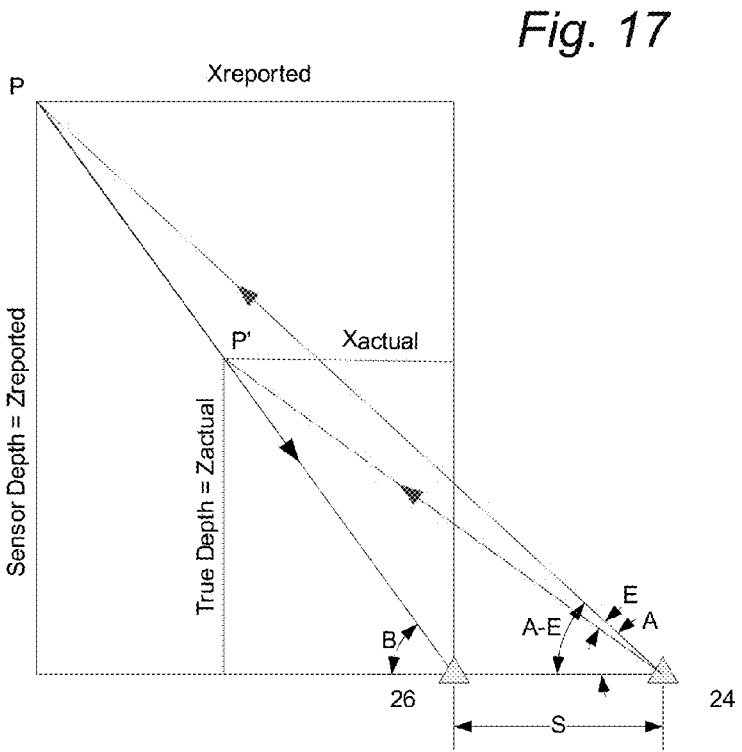
FIG. 17 is a top view as in FIG. 16, showing an error in the depth optics and a method for determining the error according to a third embodiment of the present technology.
Figure 22:
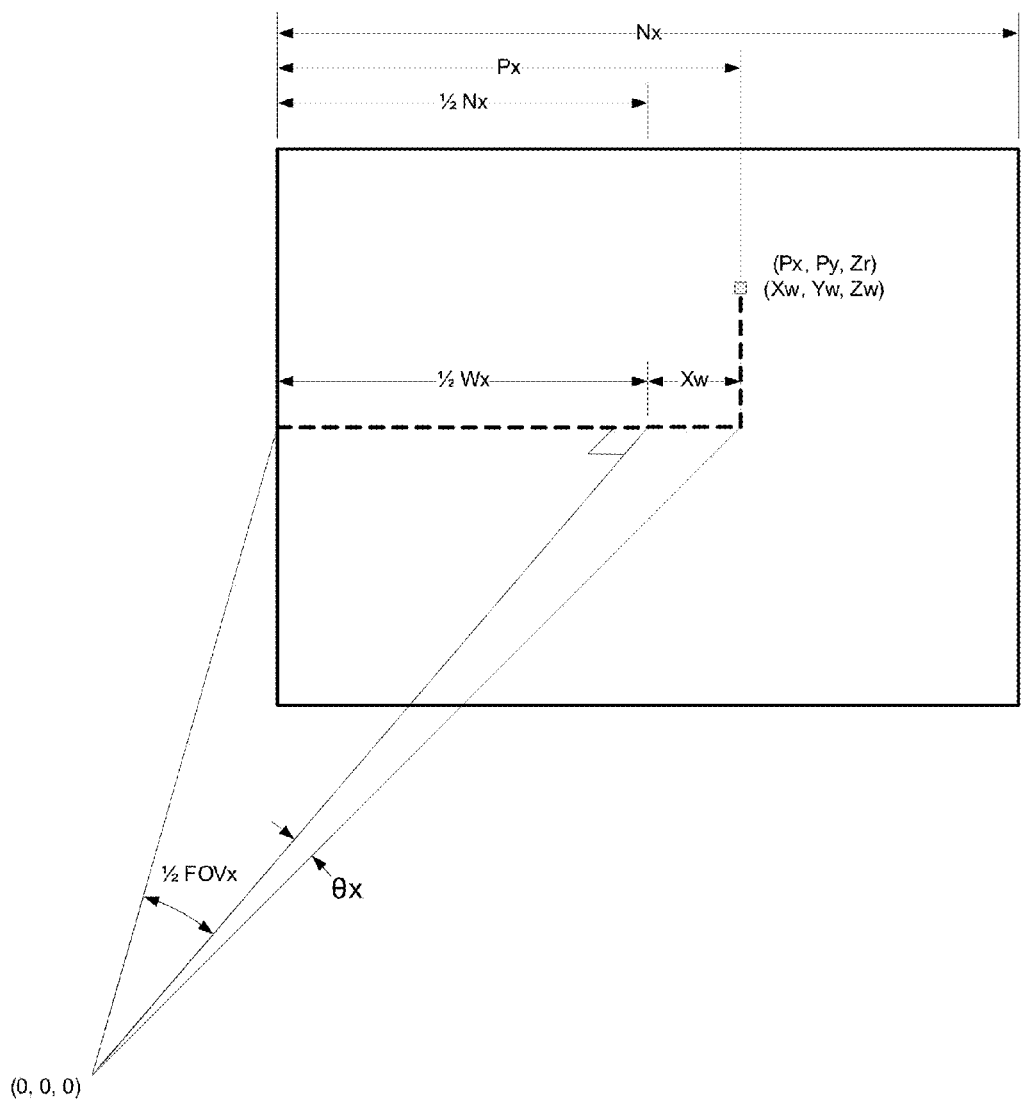
FIG. 22 shows a field of view including a generalized transformation from depth-camera space to world space, with correction for the misalignment angle E.

Referring to FIG. 22 and FIG. 17 described above, the following sets forth the generalized transformation from depth-camera space to world space, with correction for the misalignment angle E, based on the following definitions:

Point (Px, Py, Zr) represents a depth-pixel reported by the depth camera

The origin of the pixel space is lower-left corner justified

Point (Xw, Yw, Zw) represents the depth pixel in world-space coordinates

E represents the misalignment angle to compensate for, measured relative to the optical axis FOVx and FOVy are the angular fields of view, in ZX and ZY planes respectively, in which Px and Py are projected Nx and Ny are the number of pixels in X and Y pixel space respectively S is the space separating the projector and imager optical axes, which may for example be 75 mm in one example of a depth camera 20.

Transforming from pixel space to object space for the reported pixel (Px, Py, Zr) is based on the geometry of FIG. 22. Symmetry allows the same expression to be derived for Yw by substitution of the appropriate constants:

$$\frac{1}{2}Wx = Zr\tan\left(\frac{FOVx}{2}\right)$$

$$\frac{Xw}{Wx} = \frac{Px - \frac{Nx}{2}}{Nx}$$

$$Xw = Zr\left[\frac{2Px}{Nx} - 1\right]\tan\left(\frac{FOVx}{2}\right)$$

To state the transformation as a function of the input vector (Px, Py, and Z), and noting that the direction of the X axis is opposite that used to derive the angle B in the triangulation functions, angle B may first be restated using the following identities:

$$\cotan(B) = \frac{-Xr}{Zr} = \frac{-Zr\left[\frac{2Px}{Nx} - 1\right]\tan\left(\frac{FOVx}{2}\right)}{Zr}$$

$$\cotan(B) = \left[1 - \frac{2Px}{Nx}\right]\tan\left(\frac{FOVx}{2}\right)$$

Substituting into the general transform for Zactual from Zreported:

$$Za(Px, Zr, E) = \frac{ZrS\left[1 - \tan(E)\left[1 - \frac{2Px}{Nx}\right]\tan\left(\frac{FOVx}{2}\right)\right] - S^2\tan(E)}{Zr\tan(E)\left[1 + \left[1 - \frac{2Px}{Nx}\right]^2\tan^2\left(\frac{FOVx}{2}\right)\right] + S\left[1 + \tan(E)\left[1 - \frac{2Px}{Nx}\right]\tan\left(\frac{FOVx}{2}\right)\right]}$$

$$Xa(Px, Zr) = Za\left[\frac{2Px}{Nx} - 1\right]\tan\left(\frac{FOVx}{2}\right)$$

$$Ya(Py, Zr) = Za\left[\frac{2Py}{Ny} - 1\right]\tan\left(\frac{FOVy}{2}\right)$$

Table 1 is a non-limiting example of parameters which may be used for a capture device 20 in the example of FIG. 22:

TABLE 1

| Pixel source | Nx   | Ny   | FOVx   | FOVy   |
|--------------|------|------|--------|--------|
| IR           | 1280 | 960  | 57.796 | 45.053 |
| IR           | 640  | 480  | 57.796 | 45.053 |
| IR           | 320  | 240  | 57.796 | 45.053 |
| RGB          | 1280 | 1024 | 61.033 | 50.593 |

In the embodiments described above, it was assumed that the size of a calibration object in the FOV was known. However, in further embodiments performed by the recalibration engine 194, the object need only be of fixed size, but its size need not be known. One such example will now be described with reference to FIG. 23. This example minimizes real world distance variance, and operates by observing reported measurements of a rigid object in camera depth. This method relies only on depth measurements, and does not need matching measurements in a known, calibrated image (such as an RGB image). This object can be an item the user has to hold, such as a ball, book etc. Alternatively, it could be a body part such as the user's shoulders, arm etc.

In general, this method is based on the fact that the distance between a pair of points on a rigid object in x, y, z space will be the same regardless of where the pair of points are measured within the field of view. Thus, the distance between a pair of points on a fixed object may be measured at a first location, and the distance between the same pair of points on the object may be measured at a second location. To the extent the distance varies between the points measured at the first location and the same points measured at the second location, the deviation can be used to define the error model.

In this technique, the object must have a rigid property that can be measured (e.g., the radius of the ball, the length of the object, etc.) and samples are taken from the depth map only as the object is moved through the FOV. Pairs of true depth samples and sensor depth screen space (x,y) samples are taken of the rigid object at different depths and orientations to calculate a depth error offset. Multiple pairs of samples can be used for robustness. Also when the error function is not known, it can be approximated by determining depth error offsets in multiple regions in the view frustum with this technique as described above.

Figure 23:
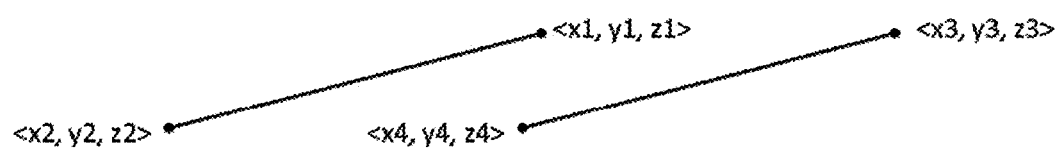
FIG. 23 shows two sets of points on a rigid body measured at two different locations according to a fourth embodiment of the present technology.

Using this technique, the depth error function may be characterized as:

$$z_{cam} = z_{real} + a$$

where a is the depth error offset at the $z_{cam}$ sampled depth. Referring now to FIG. 23, there are shown two sets of samples (x1, y1, z1)/(x2, y1, z2) and (x3, y3, z3)/(x4, y4, z4), where (x,y) are screen space coordinates in the depth map and z is the sampled depth at (x,y). As noted, each sample may represent two points on a rigid object, such as a ball, or body part. These samples can describe a depth error equation:

$$f^2(z2-z1)^2 + (x2(z2-a) - x1(z1-a))^2 + (y2(z2-a) - y1(z1-a))^2 =$$
$$f^2(z4-z3)^2 + (x4(z4-a) - x3(z3-a))^2 + (y4(z4-a) - y3(z3-a))^2$$

where f is the focal length in pixels of the depth map and a is the error coefficient.

The two solutions for the above quadratic equation are:

$$a = \frac{\left( \begin{array}{c} 2z1x1^2 - 2x2z1x1 - 2x2z2x1 + 2y1^2z1 - 2y1y2z1 + 2x2^2z2 + 2y2^2z2 - 2y1y2z2 - \\ 2x3^2z3 - 2y3z3^2z3 + 2x3 + 2x3x4z3 + 2y3y4z3 - 2x4^2z4 - 2y4^2z4 + 2x3x4z4 + 2y3y4z4 - \\ \sqrt{\left( \begin{array}{c} -2z1x1^2 + 2x2z1x1 + 2x2z2x1 - 2y1^2z1 + 2y1y2z1 - 2x2^2z2 - \\ 2y2^2z2 + 2y1y2z2 + 2x3^2z3 + 2y3^2z3 - 2x3x4z3 - \\ 2y3y4z3 + 2x4^2z4 + 2y4^2z4 - 2x3x4z4 - 2y3y4z4 - \end{array} \right)^2 } \\ 4(x1^2 - 2x2x1 + x2^2 - x3^2 - x4^2 + y1^2 + y2^2 - y3^2 - y4^2 + 2x3x4 - 2y1y2 + 2y3y4) \\ \left( \begin{array}{c} z1^2f2 + z2^2f^2 - z3^2f^2 - z4^2f^2 - 2z1z2f2 + 2z3z4f^2 + x1^2z1^2 + y1^2z1^2 + x2^2z2^2 + y2^2z2^2 - \\ x3^2z3^2 - y3^2z3^2 - x4^2z4^2 - y4^2z4^2 - 2x1x2z1z2 - 2y1y2z1z2 + 2x3x4z3z4 + 2y3y4z3z4) \end{array} \right) \end{array} \right)}{(2(x1^2 - 2x2x1 + x2^2 - x3^2 - x3^2 - x4^2 + y1^1 + y2^2 - y3^2 - y4^2 + 2x3x4 - 2y1y2 + 2y3y4))}$$

$$a = \frac{\left( \begin{array}{c} 2z1x1^2 - 2x2z1x1 - 2x2z2x1 + 2y1^2z1 - 2y1y2z1 + 2x2^2z2 + 2y2^2z2 - \\ 2y1y2z2 - 2x3^2z3 - 2y3^2z3 + 2x3x4z3 + 2y3y4z3 - 2x4^2z4 - 2y4^2z4 + 2x3x4z4 + 2y3y4z4 + \\ \sqrt{\left( \begin{array}{c} -2z1x1^2 + 2x2z1x1 + 2x2z2x1 - 2y1^2z1 + 2y1y2z1 - 2x2^2z2 - \\ 2y2^2z2 + 2y1y2z2 + 2x3^2z3 + 2y3^2z3 - 2x3x4z3 - \\ 2y3y4z3 + 2x4^2z4 + 2y4^2z4 - 2x3x4z4 - 2y3y4z4 \end{array} \right)^2 } \\ 4\left( \begin{array}{c} x1^2 - 2x2x1 + x2^2 - x3^2 - x4^2 + y1^2 + y2^2 - y3^2 - y4^2 + \\ 2x3x4 - 2y1y2 + 2y3y4 \end{array} \right) \\ \left( \begin{array}{c} z1^2f^2 + z2^2f^2 - z3^2f^2 - z4^2f^2 - 2z1z2f^2 + 2z3z4f^2 + x1^2z1^2 + y1^2z1^2 + x2^2z2^2 + y2^2z2^2 - \\ x3^2z3^2 - y3^2z^2 - x4^2z4^2 - y4^2z4^2 - 2x1x2z1z2 - 2y1y2z1z2 + 2x3x4z3z4 + 2y3y4z3z4 \end{array} \right) \end{array} \right)}{(2(x1^2 - 2x2x1 + x2^2 - x3^2 - x4^2 + y1^2 + y2^2 - y3^2 - y4^2 + 2x3x4 - 2y1y2 + 2y3y4))}$$

Only one of these solutions, namely the first one, is valid. In embodiments where the error over the FOV is assumed to be linear, two lines may be used and the resulting error coefficient a may then be used to model error across an entire FOV. In further embodiments, any number of lines may be defined using the same two points on a rigid object at different locations across the field of view. Once enough samples have been acquired calibration is performed by searching for the optimal values for the coefficients of the error model. What is minimized is some sort of measurable rigid property, such as minimizing the variance between the computed length/radius of all the samples and the average length/radius for all samples. Since the minimization of the variance is proportional to depth distortion, the values that are found are then used in the error correction function to un-distort depth.

In cases where the error function is too complex to measure, it might not be feasible/accurate enough to use the technique described above with respect to FIG. 23. One way to approximate undefined error functions is to use a set of sample pairs of close proximity, and approximate the error with a function that has a single term. In this method, the object is sampled in the same way as above, and for every pair of samples that are close to each other, a simple approximation of error is performed. As depth points are read from the camera, the spatially nearest correction is chosen and applied.

A further method of determining an error model using a calibration object of fixed, but unknown size is now explained. To be general, given a 3D point, it is assumed that its true coordinates $x=[x, y, z]^T$ and its measured coordinates $x'=[x', y', z']^T$ are related by a function g( ) with parameters p, i.e., $$x=g(x',p)$$

For example, if we use a simplified model $z'=\alpha(z-\beta)$, then $p=[\alpha,\beta]^T$, and the above vector equation becomes:

$$\begin{cases} x = x' \\ y = y' \\ z = \dfrac{z'}{\alpha} + \beta \end{cases}$$

Furthermore, it may be assumed that the uncertainty (or imprecision) of point x' is modeled by a 3×3 covariance matrix $\Lambda$. Now, consider a pair of points observed by the depth camera, denoted by $(x'_1, x'_2)$, with covariance matrices $(\Lambda_1, \Lambda_2)$. The squared distance is given by $$L_{12}^2=(x_1-x_2)^T(x_1-x_2)=(g(x'_1,p)-g(x'_2,p))^T(g(x'_1,p)-g(x'_2,p))$$

The variance of $L_{12}^2$ may be computed by:

$$\sigma_{12}^2 = \frac{dL_{12}^{2T}}{dx'_1}\Lambda_1\frac{dL_{12}^2}{dx'_1} + \frac{dL_{12}^{2T}}{dx'_2}\Lambda_2\frac{dL_{12}^2}{dx'_2}$$

where $$\frac{dL_{12}^2}{dx'_1} = 2\frac{dg(x'_1,p)}{dx'_1}(g(x'_1,p)-g(x'_2,p))$$

$$\frac{dL_{12}^2}{dx'_2} = -2\frac{dg(x'_2,p)}{dx'_2}(g(x'_1,p)-g(x'_2,p))$$

The same pair of points are observed another time by the depth camera, denoted by $(x'_3, x'_4)$, with covariance matrices $(\Lambda_3, \Lambda_4)$. $L_{34}^2$ and $\sigma_{34}^2$ may be computed in the same way as above. Since these are two observations of the same pair:

$$e=L_{12}^2-L_{34}^2=0.$$

In practice, e is not equal to 0, so its parameters p may be estimated by minimizing $e^2$. Note that one pair of points only provides one constraint, and only one parameter may be estimated.

For N pairs of points before and after motion, the parameter vector p may be estimated by minimizing the following objective function:

$$\min_p \Sigma_{i=1}^N e_i^2/v_i$$

where $e_i=L_{34}^2-L_{34,i}^2$ and $v_i$ is the variance of $e_i$, given by $v_i=\sigma_{12}^2+\sigma_{34,i}^2$. This is a nonlinear optimization, which can be done using, for example, the Levenberg-Marquardt algorithm. The initial guess is ready available if the distortion is not huge. With the simplified model $z'=\alpha(z-\beta)$, the initial guess will be $\alpha=1$ and $\beta=0$.

In the above embodiments, deviations between real depth and sensor depth was taken at a few points to define a model which may then be used to provide the measure of error at all locations within the 3-D world space captured by the capture device. In embodiments, the more sample points used to determine deviation between real and sensor depth, the more accurate the depth model may be, even for highly non-linear error models.

Moreover, the above embodiments focus on solutions which determine deviations between real and sensor depth using either no additional equipment or minimal additional equipment. This simplifies the solution and reduces cost of a commercial embodiment. However, it is understood that a variety of equipment may be used to determine real depth, such as for example lasers, additional depth cameras and other depth-finding devices.

Figure 24A:
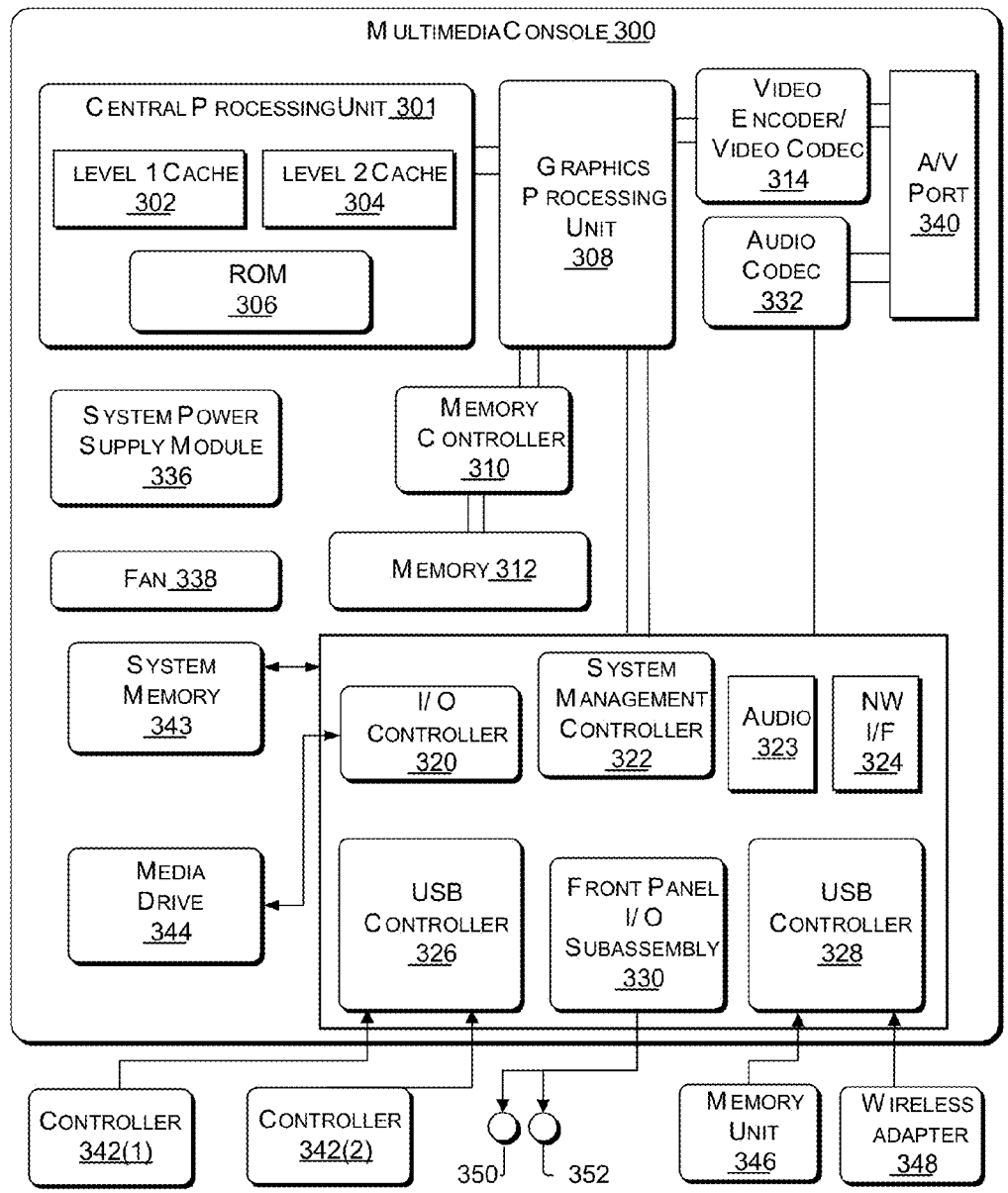
FIG. 24A illustrates an example embodiment of a computing device that may be used to interpret one or more gestures in a target recognition, analysis, and tracking system.

FIG. 24A illustrates an example embodiment of a computing environment, such as for example computing system 12, that may be used to perform the various techniques described above. The computing device 12 may be a multimedia console 300, such as a gaming console. As shown in FIG. 24A, the multimedia console 300 has a central processing unit (CPU) 301 having a level 1 cache 302, a level 2 cache 304, and a flash ROM 306. The level 1 cache 302 and a level 2 cache 304 temporarily store data and hence reduce the number of memory access cycles, thereby improving processing speed and throughput. The CPU 301 may be provided having more than one core, and thus, additional level 1 and level 2 caches 302 and 304. The flash ROM 306 may store executable code that is loaded during an initial phase of a boot process when the multimedia console 300 is powered ON.

A graphics processing unit (GPU) 308 and a video encoder/video codec (coder/decoder) 314 form a video processing pipeline for high speed and high resolution graphics processing. Data is carried from the GPU 308 to the video encoder/video codec 314 via a bus. The video processing pipeline outputs data to an A/V (audio/video) port 340 for transmission to a television or other display. A memory controller 310 is connected to the GPU 308 to facilitate processor access to various types of memory 312, such as, but not limited to, a RAM.

The multimedia console 300 includes an I/O controller 320, a system management controller 322, an audio processing unit 323, a network interface controller 324, a first USB host controller 326, a second USB host controller 328 and a front panel I/O subassembly 330 that are preferably implemented on a module 318. The USB controllers 326 and 328 serve as hosts for peripheral controllers 342(1)-342(2), a wireless adapter 348, and an external memory device 346 (e.g., flash memory, external CD/DVD ROM drive, removable media, etc.). The network interface 324 and/or wireless adapter 348 provide access to a network (e.g., the Internet, home network, etc.) and may be any of a wide variety of various wired or wireless adapter components including an Ethernet card, a modem, a Bluetooth module, a cable modem, and the like.

System memory 343 is provided to store application data that is loaded during the boot process. A media drive 344 is provided and may comprise a DVD/CD drive, hard drive, or other removable media drive, etc. The media drive 344 may be internal or external to the multimedia console 300. Application data may be accessed via the media drive 344 for execution, playback, etc. by the multimedia console 300. The media drive 344 is connected to the I/O controller 320 via a bus, such as a Serial ATA bus or other high speed connection (e.g., IEEE 1394).

The system management controller 322 provides a variety of service functions related to assuring availability of the multimedia console 300. The audio processing unit 323 and an audio codec 332 form a corresponding audio processing pipeline with high fidelity and stereo processing. Audio data is carried between the audio processing unit 323 and the audio codec 332 via a communication link. The audio processing pipeline outputs data to the A/V port 340 for reproduction by an external audio player or device having audio capabilities.

The front panel I/O subassembly 330 supports the functionality of the power button 350 and the eject button 352, as well as any LEDs (light emitting diodes) or other indicators exposed on the outer surface of the multimedia console 300. A system power supply module 336 provides power to the components of the multimedia console 300. A fan 338 cools the circuitry within the multimedia console 300.

The CPU 301, GPU 308, memory controller 310, and various other components within the multimedia console 300 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 300 is powered ON, application data may be loaded from the system memory 343 into memory 312 and/or caches 302, 304 and executed on the CPU 301. The application may present a graphical user interface that provides a consistent user experience when navigating to different media types available on the multimedia console 300. In operation, applications and/or other media contained within the media drive 344 may be launched or played from the media drive 344 to provide additional functionalities to the multimedia console 300.

The multimedia console 300 may be operated as a standalone system by simply connecting the system to a television or other display. In this standalone mode, the multimedia console 300 allows one or more users to interact with the system, watch movies, or listen to music. However, with the integration of broadband connectivity made available through the network interface 324 or the wireless adapter 348, the multimedia console 300 may further be operated as a participant in a larger network community.

When the multimedia console 300 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 300 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 301 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 342(1) and 342(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 300.

Figure 24B:
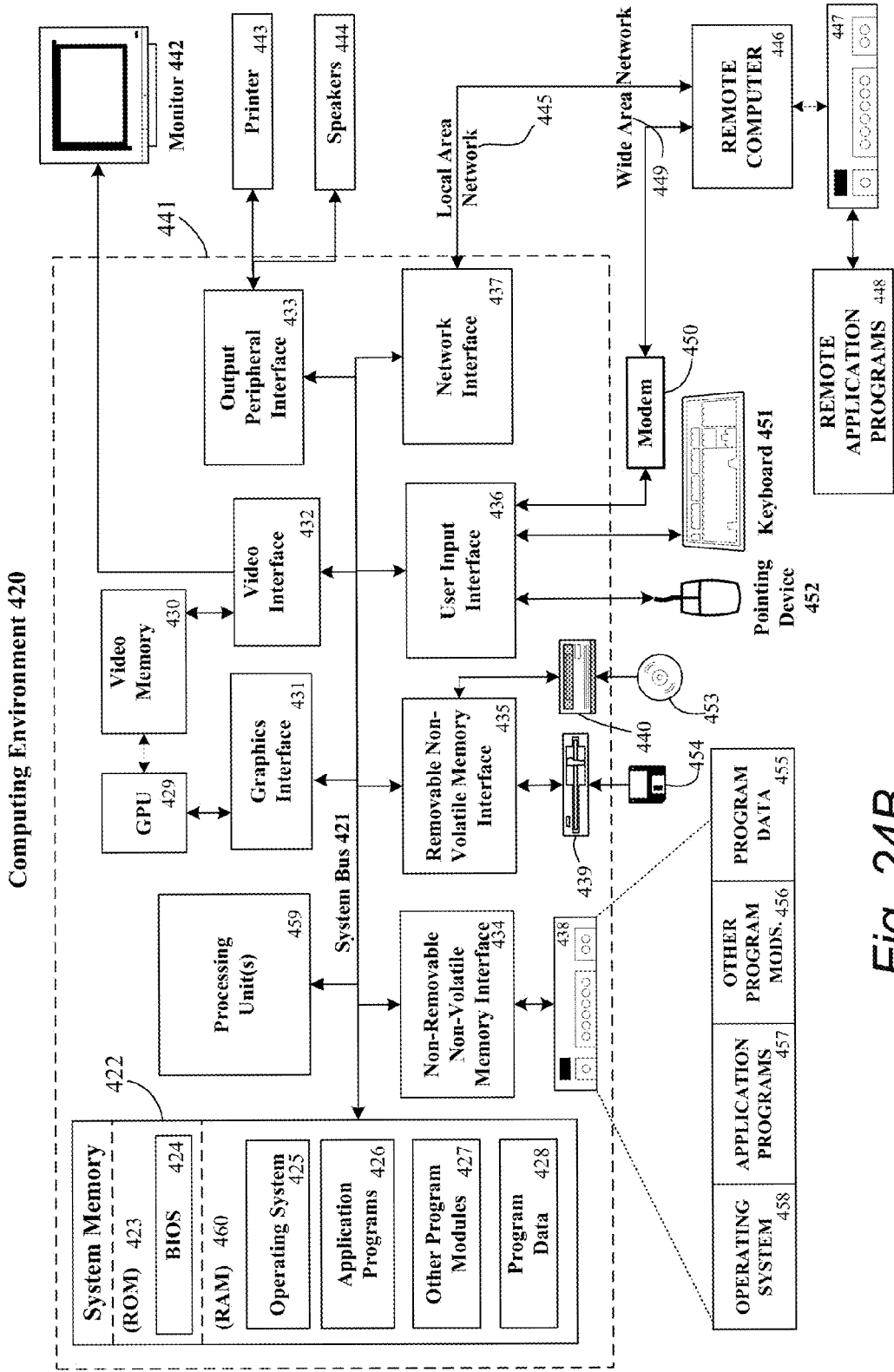
FIG. 24B illustrates another example embodiment of a computing device that may be used to interpret one or more gestures in a target recognition, analysis, and tracking system.

FIG. 24B illustrates another example embodiment of a computing environment 720 that may be the computing environment 12 shown in FIGS. 1A-2 used to interpret one or more positions and motions in a target recognition, analysis, and tracking system. The computing system environment 720 is only one example of a suitable computing environment and is not intended to suggest any limitation as to the scope of use or functionality of the presently disclosed subject matter. Neither should the computing environment 720 be interpreted as having any dependency or requirement relating to any one or combination of components illustrated in the Exemplary operating environment 720. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 24B, the computing environment 420 comprises a computer 441, which typically includes a variety of computer readable media. Computer readable media can be any available media that can be accessed by computer 441 and includes both volatile and nonvolatile media, removable and non-removable media. The system memory 422 includes computer storage media in the form of volatile and/or nonvolatile memory such as ROM 423 and RAM 460. A basic input/output system 424 (BIOS), containing the basic routines that help to transfer information between elements within computer 441, such as during start-up, is typically stored in ROM 423. RAM 460 typically contains data and/or program modules that are immediately accessible to and/or presently being operated on by processing unit 459. By way of example, and not limitation, FIG. 24B illustrates operating system 425, application programs 426, other program modules 427, and program data 428. FIG. 24B further includes a graphics processor unit (GPU) 429 having an associated video memory 430 for high speed and high resolution graphics processing and storage. The GPU 429 may be connected to the system bus 421 through a graphics interface 431.

The computer 441 may also include other removable/non-removable, volatile/nonvolatile computer storage media. By way of example only, FIG. 24B illustrates a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile computer storage media that can be used in the Exemplary operating environment include, but are not limited to, magnetic tape cassettes, flash memory cards, digital versatile disks, digital video tape, solid state RAM, solid state ROM, and the like. The hard disk drive 438 is typically connected to the system bus 421 through a non-removable memory interface such as interface 434, and magnetic disk drive 439 and optical disk drive 440 are typically connected to the system bus 421 by a removable memory interface, such as interface 435.

The drives and their associated computer storage media discussed above and illustrated in FIG. 24B, provide storage of computer readable instructions, data structures, program modules and other data for the computer 441. In FIG. 24B, for example, hard disk drive 438 is illustrated as storing operating system 458, application programs 457, other program modules 456, and program data 455. Note that these components can either be the same as or different from operating system 425, application programs 426, other program modules 427, and program data 428. Operating system 458, application programs 457, other program modules 456, and program data 455 are given different numbers here to illustrate that, at a minimum, they are different copies. A user may enter commands and information into the computer 441 through input devices such as a keyboard 451 and a pointing device 452, commonly referred to as a mouse, trackball or touch pad. Other input devices (not shown) may include a microphone, joystick, game pad, satellite dish, scanner, or the like. These and other input devices are often connected to the processing unit 459 through a user input interface 436 that is coupled to the system bus, but may be connected by other interface and bus structures, such as a parallel port, game port or a universal serial bus (USB). The cameras 26, 28 and capture device 20 may define additional input devices for the console 400. A monitor 442 or other type of display device is also connected to the system bus 421 via an interface, such as a video interface 432. In addition to the monitor, computers may also include other peripheral output devices such as speakers 444 and printer 443, which may be connected through an output peripheral interface 433.

The computer 441 may operate in a networked environment using logical connections to one or more remote computers, such as a remote computer 446. The remote computer 446 may be a personal computer, a server, a router, a network PC, a peer device or other common network node, and typically includes many or all of the elements described above relative to the computer 441, although only a memory storage device 447 has been illustrated in FIG. 24B. The logical connections depicted in FIG. 24B include a local area network (LAN) 445 and a wide area network (WAN) 449, but may also include other networks. Such networking environments are commonplace in offices, enterprise-wide computer networks, intranets and the Internet.

When used in a LAN networking environment, the computer 441 is connected to the LAN 445 through a network interface or adapter 437. When used in a WAN networking environment, the computer 441 typically includes a modem 450 or other means for establishing communications over the WAN 449, such as the Internet. The modem 450, which may be internal or external, may be connected to the system bus 421 via the user input interface 436, or other appropriate mechanism. In a networked environment, program modules depicted relative to the computer 441, or portions thereof, may be stored in the remote memory storage device. By way of example, and not limitation, FIG. 24B illustrates remote application programs 448 as residing on memory device 447. It will be appreciated that the network connections shown are Exemplary and other means of establishing a communications link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed:

1. A method of recalibrating a depth image sensor, the depth sensor capturing image data from a 3D space, the method comprising:
    a) measuring a depth value of a person in the 3-D space using the depth sensor;
    b) determining a number of pixels in the image of the person along an axis;
    c) calculating a length of the person along the axis based on the depth value measured in said step (a) and the number of pixels determined in said step (b);
    d) receiving input from the person regarding a true length of the person along the axis;
    e) determining a true depth value of the person independently of the measurement of said step (a) by comparing the length calculated in said step (c) with the true length received in said step (d);
    f) modeling a depth error resulting from a deviation in the true depth determined in said step e and the depth measured in said step (a); and g) correcting the depth measurements made by the depth sensor using the depth error modeled in said step (f).

2. The method of claim 1, said step (b) comprising the step of measuring a height, head to feet, of the person.

3. The method of claim 1, said step (b) comprising the step of measuring an arm span of the person.

4. The method of claim 1, wherein the size of the person is unknown to a computing device performing said step (b).

5. The method of claim 4, said step (c) comprising the steps of defining a first line between a set of points along the axis measured at a first location in the 3-D space, defining a second line between the same set of points measured at a second location in the 3-D space, defining an equation where the first and second lines are proportional to each other by an error coefficient, and solving for the error coefficient.

6. The method of claim 1, wherein a depth error which is linear at different points in the 3-d space is modeled using two sample points along the axis.

7. The method of claim 1, wherein a depth error which is non-linear at different points in the 3-d space is modeled using more than two sample points along the axis.

8. A method of recalibrating a depth sensor of a natural user interface, the depth sensor capturing image data from a 3-D space, the method comprising:

a) measuring a depth of an object within the 3-D space using the depth sensor;

b) receiving a user indication of an x-axis or y-axis dimensional size of an object;

c) correlating the user-indicated size of the object to a true depth of the object from the depth sensor based on a known correlation between the size of the object and number of pixels depicting that object at distances between the object and the depth sensor;

d) modeling a depth error resulting from a deviation in the true depth determined in said step (b) and the depth measured in said step (a); and e) compensating depth measurements made by the depth sensor using the depth error modeled in said step (d).

9. The method of claim 8, where, for linear depth errors, said step (d) comprises the step of modeling the error in the form of measured depth of said step (a) =$\alpha$(true depth of said step (c)) 31 $\beta$, where the $\beta$ component represents the depth at which the sensor and the true depth are equal to each other, and $\alpha$ represents the slope of a line defined between the true depth and depth measured by the depth image sensor.

* * * * *